United States Patent
Renkis

(10) Patent No.: US 12,229,787 B1
(45) Date of Patent: Feb. 18, 2025

(54) GLOBAL MARKETPLACE, AUTHENTICATION SERVICE, AND EXCHANGE FOR ASSET TAGGING, WEIGHING, MEASURING, AUTHENTICATING, AND MANAGEMENT

(71) Applicant: Martin A. Renkis, Nashville, TN (US)

(72) Inventor: Martin A. Renkis, Nashville, TN (US)

(*) Notice: Subject to any disclaimer, the term of this patent is extended or adjusted under 35 U.S.C. 154(b) by 557 days.

(21) Appl. No.: 17/119,506

(22) Filed: Dec. 11, 2020

Related U.S. Application Data

(60) Provisional application No. 62/951,460, filed on Dec. 20, 2019.

(51) Int. Cl.

| | |
|---|---|
| G06Q 30/018 | (2023.01) |
| G01G 19/00 | (2006.01) |
| G06K 7/10 | (2006.01) |
| G06K 7/14 | (2006.01) |
| G06N 20/00 | (2019.01) |
| G06Q 10/087 | (2023.01) |
| G06Q 10/20 | (2023.01) |
| G06Q 30/016 | (2023.01) |
| G06Q 30/0202 | (2023.01) |
| G06Q 30/0601 | (2023.01) |
| G06Q 30/0645 | (2023.01) |
| G06Q 50/00 | (2024.01) |
| G06V 20/00 | (2022.01) |
| G06V 30/10 | (2022.01) |

(52) U.S. Cl.
CPC ......... *G06Q 30/0185* (2013.01); *G01G 19/00* (2013.01); *G06K 7/10297* (2013.01); *G06K 7/1413* (2013.01); *G06K 7/1417* (2013.01); *G06N 20/00* (2019.01); *G06Q 10/087* (2013.01); *G06Q 10/20* (2013.01); *G06Q 30/016* (2013.01); *G06Q 30/0202* (2013.01); *G06Q 30/0607* (2013.01); *G06Q 30/0645* (2013.01); *G06Q 50/01* (2013.01); *G06K 2007/10504* (2013.01); *G06Q 30/0623* (2013.01); *G06V 20/00* (2022.01); *G06V 30/10* (2022.01)

(58) Field of Classification Search
CPC ............ G06Q 30/0185; G06Q 10/087; G06Q 10/20; G06Q 30/016; G06Q 30/0202; G06Q 30/0607; G06Q 30/0645; G06Q 50/01; G06Q 30/0623; G01G 19/00; G06K 7/10297; G06K 7/1413; G06K 7/1417; G06K 2007/10504; G06N 20/00; G06V 20/00; G06V 30/10
USPC ....................................................... 705/7.31
See application file for complete search history.

(56) References Cited

U.S. PATENT DOCUMENTS

| | | | |
|---|---|---|---|
| 9,412,086 B2 | 8/2016 | Morse et al. | |
| 10,229,387 B2 | 3/2019 | Wade et al. | |
| 11,468,400 B1 * | 10/2022 | Kumar | G01G 19/387 |

(Continued)

*Primary Examiner* — Francis Z. Santiago Merced
(74) *Attorney, Agent, or Firm* — NEO IP

(57) ABSTRACT

Systems and methods for a global marketplace, authentication service, and exchange for asset tagging, weighing, measuring, authenticating, and management. Users connect any item to the platform by scanning a tag affixed to the item. Scanned items are registered to a user's account. The platform deploys Artificial Intelligence (AI), Machine Learning (ML), and Deep Learning (DL) in order to promote efficient and effective marketing and monetization of a user's registered items, in addition to providing organizational, repair, and maintenance services for any item tagged by a user.

19 Claims, 10 Drawing Sheets

(56) References Cited

U.S. PATENT DOCUMENTS

| | | |
|---|---|---|
| 2002/0143564 A1 | 10/2002 | Webb et al. |
| 2003/0214387 A1 | 11/2003 | Giaccherini |
| 2008/0065514 A1 | 3/2008 | Eaton |
| 2008/0120167 A1 | 5/2008 | Guenster et al. |
| 2013/0197989 A1 | 8/2013 | Anthonyson et al. |
| 2014/0006131 A1 | 1/2014 | Causey et al. |
| 2016/0371630 A1 | 12/2016 | Jetcheva et al. |
| 2017/0270473 A1 | 9/2017 | Gloria et al. |
| 2017/0330137 A1* | 11/2017 | Wade .................. G06K 19/0614 |
| 2018/0342007 A1* | 11/2018 | Brannigan ......... G06Q 30/0643 |

* cited by examiner

GLOBAL MARKETPLACE, AUTHENTICATION SERVICE, AND EXCHANGE FOR ASSET TAGGING, WEIGHING, MEASURING, AUTHENTICATING, AND MANAGEMENT

CROSS REFERENCES TO RELATED APPLICATION

This application is related to and claims priority from the following U.S. patents and patent applications. This application claims priority from U.S. Provisional Patent Application No. 62/951,460, filed Dec. 20, 2019, which is incorporated herein by reference in its entirety.

BACKGROUND OF THE INVENTION

1. Field of the Invention

The present invention relates to asset management and monetization systems, and more specifically to tagging, connecting, managing, weighing, measuring, authenticating, and monetizing the assets of a user.

2. Description of the Prior Art

It is generally known in the prior art to provide inventory management systems, enabling users to connecting their personal inventory to a mobile application and/or a computer network.

The number of connected devices that are in use worldwide now exceeds 17 billion, with the number of Internet of Things (IoT) devices at 7 billion. By 2025, the number of connected devices is expected to surpass 34 billion. Currently in the U.S. there are approximately eight connected devices per person, a number expected to climb to 13.6 per person by 2022. Prior art patent documents include the following:

U.S. Pat. No. 9,412,086 for an apparatus and method for customized product management by Morse et. al, filed Mar. 7, 2013 and issued Aug. 9, 2016, is directed to an electronic identification system that integrates with consumer purchased products for management of data in digital form by way of an interconnected computing system, network, and/or mobile device. The system utilizes a scanning system and coded labels that facilitate a uniform identification of goods within a sales setting or within a household. Such a system would enable the use of SMART technology systems in household appliances, warehouses and retail such that the system implements mobile applications and interfacing through a high-speed network.

U.S. Pat. No. 10,229,387 for information and tracking marking system and method with modifiable marks by inventor Wade et. al, filed Apr. 19, 2017 and issued Mar. 12, 2019, is directed to information tracking of items and/or other objects associated with items. Some embodiments can include information tracking of the use of the items and/or objects. Some embodiments can include the use of markers associated with the items. At least one of the markers may be modifiable. In at least one embodiment, a marker can be configured to generate a certain detectable property (e.g., emit a signal, have a certain pattern, have a certain color, have a certain magnetic property, etc.). During use of the item and/or object associated with the item, the marker can be used to generate tracking information. Upon changing its detectable property, the marker can be caused to generate different and/or additional tracking information.

U.S. Publication No. 2013/0197989 for an intelligent information life management system for consumers by inventor Anthonyson et. al, filed Feb. 1, 2012 and published Aug. 1, 2013, is directed to consumer product lifecycle maintenance and systems and methods therefor. The invention generally involves receiving and storing a consumer registration of a tangible asset, matching a provider to the consumer based on a later-arising maintenance need associated with the asset, and relaying a communication from the provider to the consumer.

U.S. Publication No. 2014/0006131 for interactive inventory systems and methods by inventor Causey et. al, filed Jun. 30, 2012 and published Jan. 2, 2014, is directed to providing devices, systems, and methods for interacting with a home inventory system. Home inventory systems may include appliances and storages which take inventory of their contents. Home inventory systems may interact with mobile devices to alert users of necessary or desired products. Using location information, users may be alerted when their mobile device is within proximity of a necessary or desired product.

U.S. Publication No. 2008/0065514 for a personal inventory management and item exchange network by inventor Eaton, filed Sep. 7, 2007 and published Mar. 13, 2008, is directed to techniques for personal inventory management and an item exchange network, including generating an interface using data associated with a personal inventory comprising an item listing, the interface being used to manage the personal inventory, the interface being generated by a system configured to provide one or more options to manage the personal inventory and to prevent access to the personal inventory, presenting the item listing in the interface, the interface being accessible by one or more endpoints and including a marketplace configured to perform an activity associated with the item listing, the data being used to present the item listing on a network, the item listing describing an item, and receiving an input associated with the item listing, the input indicating initiation of an activity associated with an item described by the item listing.

U.S. Publication No. 2016/0371630 for personal inventory management for a quantified home by inventory Jetcheva et. al, filed Jun. 17, 2015 and published Dec. 22, 2016, is directed to a system including a quantified home, a mobile client device and an inventory analytics server. The quantified home includes an item set and one or more reader devices. The item set includes an item and a tag that is affixed to the item. The tag is configured to be monitored by the one or more reader devices. The mobile client device is configured to register the item with a personal inventory and receive description data describing a set of conditions associated with the item. The one or more reader devices are configured to monitor movement of the tag within the quantified home and generate history data describing the movement. The inventory analytics server is configured to receive the description data and history data. The inventory analytics server is configured to determine that a condition included in the set of conditions has been met and initiate a user specified action.

U.S. Publication No. 2017/0270473 for systems and methods for securely searching and exchanging database relationships between registered inventory by inventor Gloria et. al, filed Mar. 20, 2017 and published Sep. 21, 2017, is directed to an inventory tracking system that uses labels (e.g., two dimensional (2D) DataMatrix™/QR Code™ objects, or virtual labels) including encoded unique identifiers (e.g., a code) to track physical items as they are transferred and/or controlled by different registered entities of the inventory tracking system. In some embodiments, the system includes a mobile application that scans a special label attached to an item (e.g., a hammer) or generates a unique virtual label for the item to register the item. The system can then track the personal inventory of the user and allow the user to track lending, re-lending, donation, and any other interactions related to the item with other registered entities scanning the physical or the virtual labels associated with the item. The item transactions may be incentivized through gamification features to regulate and drive further adoption by users.

U.S. Publication No. 2002/0143564 for a website for household inventory and maintenance with a reminder system and method by inventor Webb et. al, filed Apr. 3, 2001 and published Oct. 3, 2002, is directed to a method of home maintenance comprising tracking a household inventory of items and related maintenance tasks for a user in a calendaring system and inventory system. The method includes notifying the user with a reminder from a home maintenance web site with the reminder including a notice to perform a maintenance task on an item of the household inventory and including a network link to the home maintenance web site. A computer-based home maintenance system comprises a user interface, a home maintenance website, a maintenance notification, and a network communication link permitting communication between the user interface and the home maintenance web site. The notification is viewable on the user interface that is generated by the home maintenance web site and includes a reminder to perform a maintenance job.

U.S. Publication No. 2008/0120167 for a personal inventory and marketing electronic system and method by inventor Guenster et. al, filed Nov. 16, 2007 and published May 22, 2008, is directed to a personal inventory and marketing electronic system and method. The system comprises a RFID tag interrogator that collects data from RFID tags attached to user's items, a host computer that stores and processes such data, a computer interface and a software resident on the host computer. The computer-implemented method is able to provide a personal inventory of user's items placed at the interrogation locations by collecting data stored on RFID tags. Subsequently, the method includes means for offering such items for sale and exchange in online platforms. It also allows generating recommendation lists of items predicted to be of interest for the user and purchasing such items upon authorization of the user.

U.S. Publication No. 2003/0214387 for an inventory and location system by inventor Giaccherini, filed May 20, 2002 and published Nov. 20, 2003, is directed to methods and an apparatus for locating items using passive transponders called radio frequency identification devices or "RFIDs." In a first embodiment of the invention, a small business like a law firm or doctor's office can use self-adhesive RFID labels to keep track of files and important papers. In a second embodiment, items purchased from a retailer which are already attached to an RFID label are automatically detected and tracked by a wireless sniffer when the purchases are brought home. In a third embodiment, a retailer uses the RFID labels to conduct an automatic wireless inventory. In a fourth embodiment, the retailer uses the same system to reduce losses due to theft of merchandise. In a fifth embodiment, the retailer uses the RFID labels to provide automatic wireless check-out. In a sixth embodiment, the retailer analyzes the inventory of goods within a customer's home to enhance sales and marketing strategies. In a seventh embodiment, the retailer uses the home inventory data to furnish automatic order fulfillment. In an eighth embodiment, the customer uses the portable sniffer to retrieve information about a product stored in an RFID.

SUMMARY OF THE INVENTION

The present invention relates to systems and methods for tagging, connecting, weighing, measuring, managing, authenticating, and monetizing objects and devices which traditionally have not had network access to a network.

In one embodiment, the present invention includes a system for tagging and managing assets as described herein.

In another embodiment, the present invention includes a method for tagging and managing assets as described herein.

These and other aspects of the present invention will become apparent to those skilled in the art after a reading of the following description of the preferred embodiment when considered with the drawings, as they support the claimed invention.

DETAILED DESCRIPTION

Figure 1:
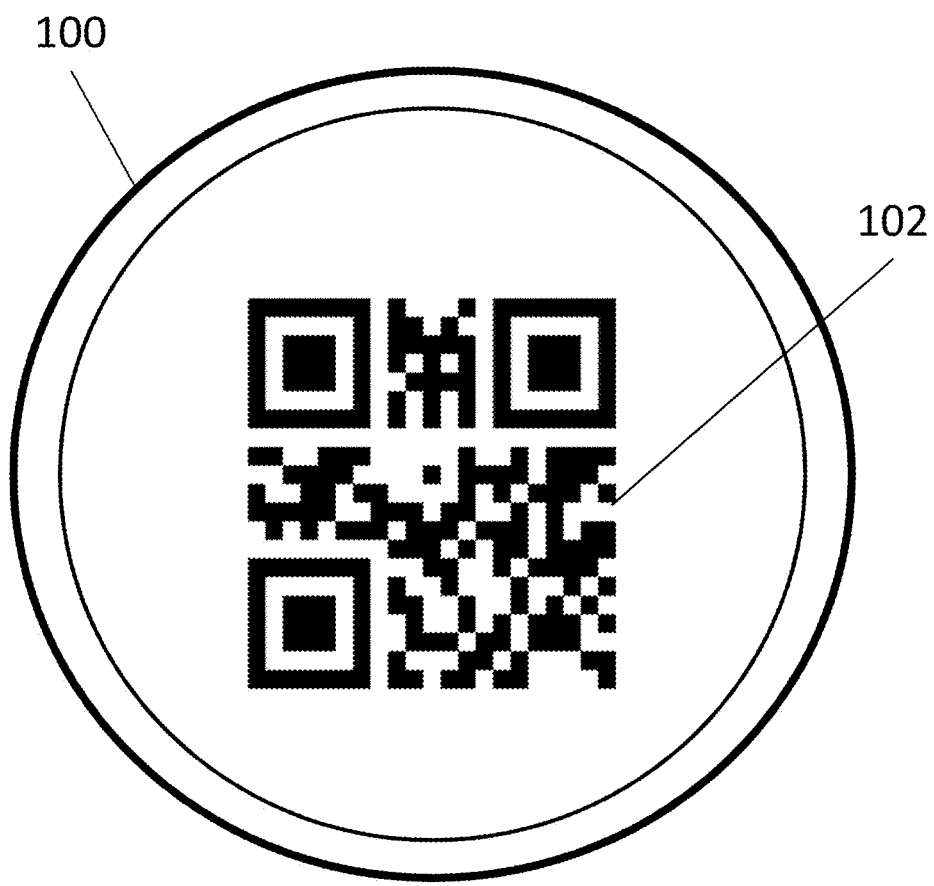
FIG. 1 illustrates one embodiment of a tagged asset.

The present invention is generally directed to systems and methods for tagging, connecting, weighing, authenticating, managing, and monetizing assets which traditionally are not connected to other devices and are not operable to be connected to a network.

Over the years, many homes and businesses accumulate a large number of items. It can be difficult to organize belongings, personal inventories, and other items when a home, business, and/or environment becomes cluttered. Furthermore, not all devices are smart devices. These "dumb devices" lack any networking functionality and capabilities. Despite the increasing presence of connected devices, less than 0.1% of all products shipped by the two largest online retailers, Amazon and Alibaba, are connected and technologies, services, and processes for tagging, weighing, measuring, authenticating, managing, and monetizing these products in a single unified solution are needed.

Having the ability to tag these "dumb" devices makes organization simple, in addition to enabling anyone to instantly calculate the total value of their assets. Moreover, the present invention provides a platform for users to connect with others who have a shared interest in tagging and connecting their assets.

In addition, businesses which sell products by weight, such as restaurants which sell liquor, wine, and beer, have limited, complicated, or manual ways to track the pouring of liquor, wine, and beer. Because of this, these businesses commonly experience waste and theft of products. Other businesses, such as those in the *cannabis* industry, have strict regulations that make it cumbersome to process, manage, and sell products (e.g., *cannabis*), which are sold by weight.

The present invention utilizes a global marketplace, authentication, and exchange platform for registering any tagged object. The platform is operable to allow users to connect any item and/or object to an online marketplace, including, but not limited to, dumb devices. The platform also includes a smart scale which connects to a hub and/or directly to the Internet. The smart scale sends data to the platform in real-time, or near real-time, including, but not limited to, weight and measurements such as size, dimensions, mass, density, temperature, humidity, an image, and/or video of any asset. Once items are registered with the platform, Machine Learning (ML), Deep Learning (DL), and/or Artificial Intelligence (AI) are deployed to assist in the marketing and monetization of a user's full inventory of registered assets, organize an inventory of registered items, connect users to others with similar interests and/or registered inventories, receive product support and upgrades for registered items, receive repair and maintenance notifications for registered items, track user engagement with the platform, and/or receive market research specific to a user's registered items. The system is also operable to manage the measurements of any asset and provide detailed reporting and alerts based on the measurements.

Referring now to the drawings in general, the illustrations are for the purpose of describing one or more preferred embodiments of the invention and are not intended to limit the invention thereto.

Tags

FIG. 1 illustrates one embodiment of a tagged asset. At least one asset 100 is operable to have at least one tag 102 affixed to it.

In one embodiment, tagging uses automatic identification and data capture (AIDC) technologies. AIDC refers to the methods of automatically identifying objects, collecting data about the objects, and entering data into computer systems, without human involvement. Technologies considered as part of AIDC include, but are not limited to, Near Field Communications (NFC), Quick Response (QR) codes, bar codes, radio frequency identification (RFID), Universal Product Code (UPC), biometrics, magnetic strips, Optical Character Recognition (OCR), smart cards, video analysis, and voice recognition.

AIDC is the process of obtaining external data, through the analysis of images, sounds, or videos. To capture data, a transducer is employed which converts an actual image or a sound into a digital file. The digital file is then stored and is later analyzed by a computing device or compared against other files in a database to verify identity or to provide authorization to enter a secured system. In one embodiment, the tag is a QR code. QR codes are a type of matrix barcode, or two-dimensional (2D) barcode. QR codes contain data for a locator, identifier, and/or tracker that connects to a website or application. A QR code uses four standardized encoding modes (numeric, alphanumeric, byte/binary, and kanji) to share data efficiently. QR codes enable anything to be turned into an interaction point capable of performing a digital task or experience.

In another embodiment, the tag is a barcode.

In another embodiment, the tag is a Stock Keeping Unit (SKU).

In another embodiment, the tag is a UPC tag.

In another embodiment, the tag is a magnetic tag.

In another embodiment, the tag is a near field communication (NFC) tag. NFC is a set of communication protocols that enable two devices to establish communication by bringing the devices close to each other.

In one embodiment, the tag is an RFID tag. RFID uses electromagnetic fields to automatically identify and track tags attached to objects. The tags contain electronically stored information. Passive tags collect energy from a nearby RFID reader's interrogating radio waves. Active tags have a local power source and operate remotely from an RFID reader. Unlike a barcode, the tags do not need to be within a line of sight of the RFID reader. In one embodiment, the RFID tag is embedded in an object.

In one embodiment, the tag is a combination of an RFID tag and a QR code. In another embodiment, the tag is a combination of an NFC tag and a QR code.

In one embodiment, a tag uses a Passive Reader Active Tag (PRAT) system. A PRAT system has a passive reader which only receives radio signals from active tags. The reception range of a PRAT system reader is operable to be adjusted from about 1 foot to about 2,000 feet.

In one embodiment, a tag uses an Active Reader Passive Tag (ARPT) system. An ARPT system uses an active reader, which transmits interrogator signals and also receives authentication replies from passive tags.

In one embodiment, a tag uses an Active Reader Active Tag (ARAT) system. An ARAT system uses active tags that are awoken with an interrogator signal from an active reader. In another embodiment, the ARAT system uses a Battery-Assisted Passive (BAP) tag, acting like a passive tag but with a small battery to power the tag's return reporting signal.

In another embodiment, the tag is a chipless RFID tag. Chipless RFID tags are RFID tags that do not require a microchip in the transponder. Chipless RFID tags use either time-domain reflectometry or frequency signature techniques. In time-domain reflectometry techniques, the interrogator sends a pulse and listens for echoes. The time of pulse arrivals encodes the data. In frequency signature techniques, the interrogator sends waves of several frequencies, a broadband pulse or a chirp, and monitors the echoes' frequency content. The presence or absence of certain frequency components in the received waves encodes the data. Chemicals, magnetic materials, or resonant circuits are used to attenuate or absorb radiation of a particular frequency.

In one embodiment, the tag is a SnapTag. A SnapTag is a 2D mobile barcode alternative similar to a QR code, but uses an icon or company logo and code ring rather than a square pattern of black dots. SnapTags can be used to take consumers to a brand's website or mobile application, and can also facilitate mobile purchases, coupon downloads, free sample requests, video views, promotional entries, Facebook likes, Pinterest Pins, Twitter Follows, Posts, and Tweets. In addition, SnapTags offer back-end data mining capabilities.

In another embodiment, the tag is a combination of at least two tag types including, but not limited to, NFC tags, RFID tags, QR codes, SnapTags, ARAT tags, Chipless RFID tags, PRAT tags, barcode, and/or SKU.

In yet another embodiment, the tag is a single tag with at least two of the previously mentioned tagging technologies built into the single tag. For example, older mobile devices do not have NFC capabilities and would only be operable to interact with a QR code. Another example includes combining UPC and NFC in one tag. In this example, a UPC code is already assigned to an asset as a general reference (e.g., a 750 mL bottle of JACK DANIELS) and the NFC code gives that asset a specific and unique serial number.

Tag size, shape, and color can vary. In one embodiment, a tag is operable for indoor and/or outdoor use. In another embodiment, a tag is permanent. In another embodiment, a tag is temporary. In yet another embodiment, a tag is a custom design and/or custom text defined by a user. In yet another embodiment, the tag is a logo.

Tags operable for indoor use include, but are not limited to, direct thermal paper tags, direct thermal plastic tags, thermal transfer paper tags, thermal transfer plastic tags, thermal transfer polyester tags, synthetic tags, chemical-resistant polyester tags, retro-reflective tags, gloss-coated plastic tags, paper tags, litho paper tags, high gloss paper tags, semi-gloss paper tags, foil paper tags, vinyl tags, static cling vinyl tags, polypropylene tags, polyethylene tags, flexible printed circuit tags, silicone tags, polyimide tags, acrylonitrile butadiene styrene (ABS) tags, aluminum tags, copper tags, metal coil tags, fluorescent tags, permanent adhesive tags, tags with a removable adhesive, and/or tags with a repositionable adhesive.

Tags operable for outdoors use include, but are not limited to, polyethylene tags, flexible printed circuit tags, silicone tags, polyimide tags, ABS tags, paper tags, aluminum tags, copper tags, metal coil tags, tags where the graphics are sealed beneath a sapphire-hard anodic layer of metal, laminated tag stickers, high-temperature metal tags, stainless steel tag labels, polyester tags with a permanent pressure-sensitive adhesive, and/or tags requiring a one-time application of a paint mask.

In one embodiment, the tag incorporates at least two types of indoor and/or outdoor tag types and/or technologies.

Figure 2:
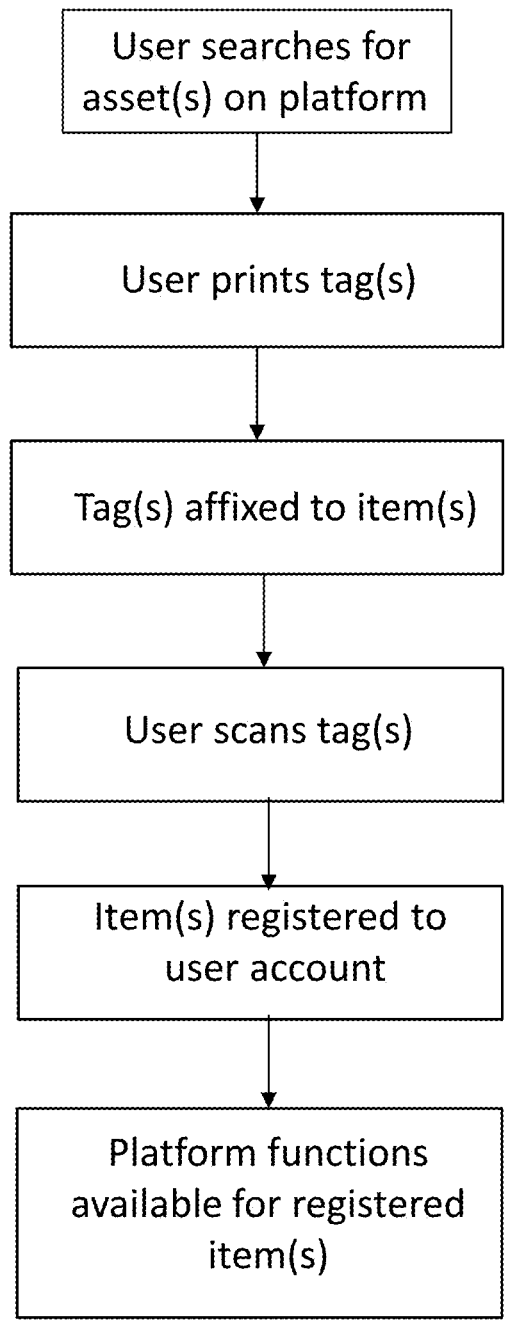
FIG. 2 illustrates one embodiment of a method for connecting and registering an asset.

FIG. 2 illustrates one embodiment of a method for connecting and registering an asset. In one embodiment, a global marketplace and exchange platform is operable to be searched for at least one asset by a user. The platform search returns the results of the user's search, wherein at least one search result matches the at least one asset. The platform is operable to select the at least one search result matching the at least one asset based on user input. The platform is operable to print at least one tag for the at least one asset. The at least one tag is affixed or attached to the at least one asset by the user. Using a computing device, the at least one tag on the at least one asset is scanned by the user. In one embodiment, the computing device is a mobile computing device. In another embodiment, the computing device is a smart phone. The scanned asset is then registered to the user's account. In one embodiment, the scanned asset is automatically registered to the user's account. In another embodiment, the scanned asset is manually registered to the user's account, enabling the editing of scanned asset information. The platform enables a variety of functions to be performed by the user for any registered assets including, but not limited to, selling at least one registered asset, trading at least one registered asset with at least one other user, loaning at least one registered asset to at least one other user, locate accessories for the at least one registered asset, locate add-ons for the at least one registered asset, track and sell services for at least one registered asset, track maintenance on at least one registered asset, market upgrades for at least one registered asset, sell upgrades for at least one registered asset, market affiliated products and services for the at least one registered asset, sell affiliated products and services for the at least one registered asset, create social communities for the at least one registered asset, share the at least one registered asset on at least one linked social media account, authenticate the at least one registered asset, track the location of the at least one registered asset, access self-service for the at least one registered asset, access support for the at least one asset, and/or track the engagement of other users for the at least one registered asset.

Figure 3:
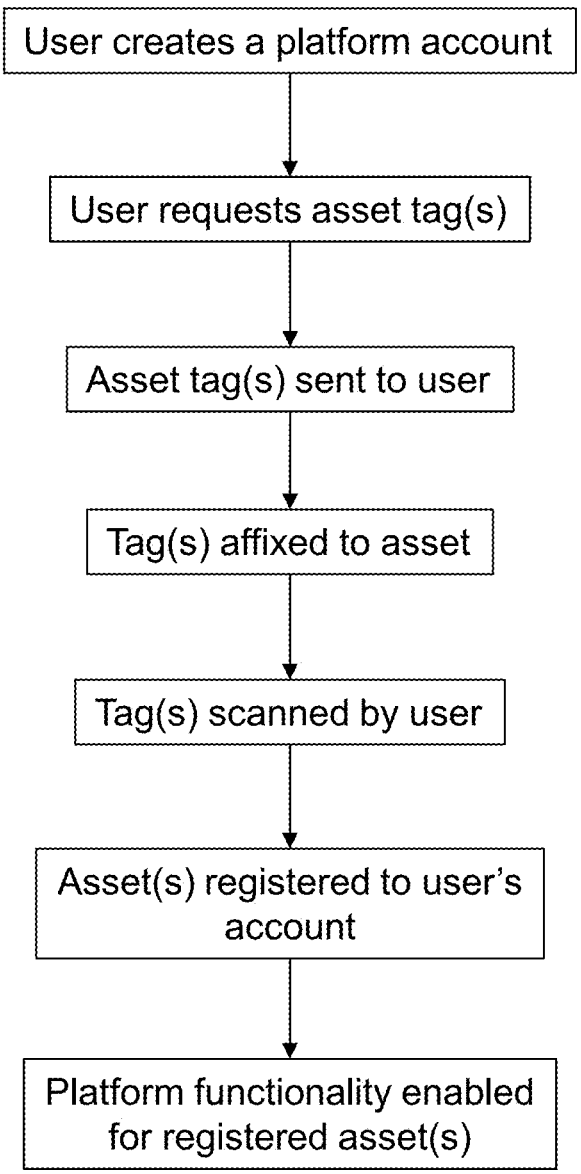
FIG. 3 illustrates one embodiment of a method for connecting and registering an asset.

FIG. 3 illustrates one embodiment of a method for connecting and registering an asset. In one embodiment, an account for the global marketplace, authentication, and exchange platform and/or application is created by a user, at least one asset tag is requested from the global marketplace, authentication, and exchange platform and/or application for at least one asset by the user, the at least one asset tag is sent to the user, the at least one asset tag is affixed to at least one asset by the user, the at least one asset tag is scanned by the user using at least one user device, the at least one asset is registered to the user's account, thereby creating at least one registered asset, and platform functionality is enabled for the at least one registered asset.

In one embodiment, an asset with a tag already affixed to it is acquired by a user. The tag is scanned using a computing device by a user in order to connect and register the asset to the user's account. In one embodiment, the computing device is in network communication with the application and/or platform.

In one embodiment, the application and/or platform is operable to allow users to provide a review of a registered asset. In one embodiment, where a user has received an asset from a second user and is not registering the asset to their account, the application and/or platform is operable to allow the user to provide a review of the second user and/or a review of the registered asset.

In another embodiment, a tag is placed on an asset and the asset is operable to interact with a smart scale. The smart scale is operable to read the tag data, weigh or measure the asset, and confirm tag data using alerts including, but not limited to, sound, light, and/or sending an alert and/or notification to a computing device. In one embodiment, the computing device is a mobile computing device.

Figure 4:
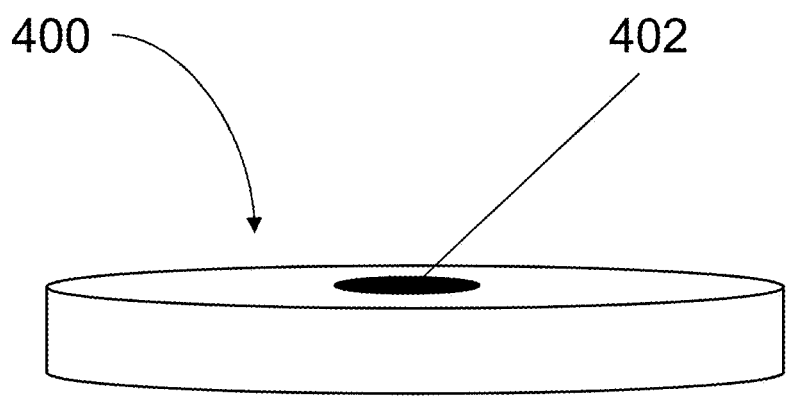
FIG. 4 illustrates one embodiment of a smart scale of the present invention.

FIG. 4 illustrates one embodiment of a smart scale of the present invention. The smart scale ("smart disc") 400 is operable to acquire data associated with a tagged asset including, but not limited to, measurements, weight, mass, dimensions, humidity, temperature, and/or density. The smart disc(s) 400 includes at least one sensor 402, wherein the at least one sensor 402 is operable to acquire tag data using technologies including, but not limited to, NFC tags, QR codes, RFID tags, OCR tags, photographs, video, infrared (IR) images, magnetic tags, smart card tags, and/or voice capturing technologies. In one embodiment, the sensor is a camera operable to take photographs of the tag and/or the tagged asset. In another embodiment, the sensor is a recording device operable to take videos of the tag and/or the tagged asset. In yet another embodiment, the sensor is a recording device operable to take audio recordings of the tagged asset.

The smart disc is operable for direct computing device connection. In one embodiment, the smart disc is operable for directing mobile computing device connections. This connection is established by network communication techniques and technologies including, but not limited to, BLUETOOTH, NFC, cellular communication, and/or WI-FI.

In one embodiment, whenever a tagged and connected asset is placed on the smart disc, the sensor in the smart disc acquires a weight and/or a measurement associated with the tagged and connected asset from the tag associated with the asset. This tracks details about the asset every time it is placed on the smart disc. The weight and/or the measurement is sent directly to the platform and stored in a data storage device associated with the platform.

In one embodiment, the smart disc is operable to connect directly to at least one other smart disc using network communication techniques and technologies, including, but not limited to, BLUETOOTH, NFC, cellular communication, and/or WI-FI. In one embodiment, whenever a tagged and connected asset is placed on the smart disc, the sensor in the smart disc acquires a weight and/or a measurement associated with the tagged and connected asset from the tag associated with the asset. This tracks details about the asset every time it is placed on the smart disc. The weight and/or the measurement is sent directly to at least one other smart disc.

In one embodiment, the smart disc is operable for network communication with the platform using cloud computing techniques and technologies. The smart disc connects to the platform directly using integrated WI-FI and/or cellular communication. In addition, the smart disc is operable for network communication with a data storage device and/or a mobile computing device using BLUETOOTH and/or WI-FI, wherein the data storage device is in network communication with the platform. In one embodiment, the data storage device is a local data storage device.

In another embodiment, the smart disc is Long-Term Evolution (LTE) connected.

In one embodiment, the smart disc is battery operated. In another embodiment, the smart disc is powered using solar energy. In another embodiment, the smart disc is powered by a rechargeable battery.

Each smart disc is indestructible and/or waterproof.

The smart disc(s) are operable to send acquired data to the platform in real-time, near real-time, at set intervals, and/or after a measurement has been taken.

Figure 5:
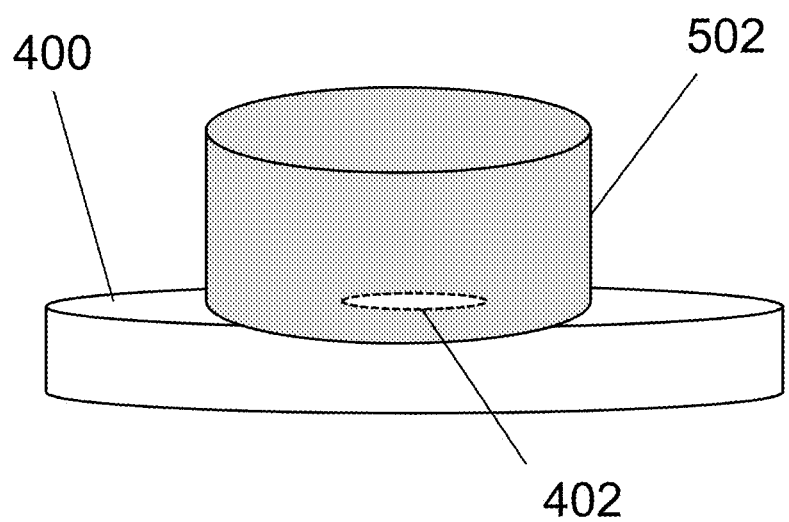
FIG. 5 illustrates one embodiment of a smart scale interacting with a tagged asset.

FIG. 5 illustrates one embodiment of a smart scale interacting with a tagged asset. At least one smart disc 400 is operable to interact with at least one tagged asset 502 when the at least one tagged asset 502 is set and/or placed on the at least one smart disc 400, wherein the at least one smart disc includes at least one sensor 402. The at least one sensor 402 is operable to read data from the at least one tagged asset 502 and/or write data to the at least one tagged asset 502.

Tracking

Any asset tagged is operable to have its location tracked. In one embodiment, a tagged asset's location is saved to the application and/or platform when the tag is scanned.

In one embodiment, asset tracking must be enabled in the application and/or platform for at least one registered asset by a user. In another embodiment, asset tracking for the at least one registered asset is automatic.

In one embodiment, the application and/or platform is operable to allow a custom physical location to be manually entered by a user.

In one embodiment, the location where an asset is initially registered is stored on the In one embodiment, tracking is based on a Global Positioning System (GPS). In another embodiment, tracking is based on an Internet Protocol (IP) address. In another embodiment, tracking is based on a Media Access Control (MAC) address. In another embodiment, tracking is based on RFID. In yet another embodiment, tracking is based on a WI-FI positioning system. In yet another embodiment, tracking is based on asset fingerprint. In yet another embodiment, tracking is based on canvas fingerprinting. Canvas fingerprinting is a browser fingerprinting technique for tracking online users using the HTML 5 canvas element instead of browser cookies or other similar means. In yet another embodiment, tracking is based on geofencing. In one embodiment, tracking supports the W3C Geolocation standard.

In one embodiment, the platform and/or application is operable to provide the user with an alert if the tagged and tracked asset changes its current location.

Application

Through the use of tags, assets and/or objects are registered with a global marketplace, authentication, and exchange platform. The global marketplace, authentication, and exchange platform is operable for user interaction and/or modification via a graphical user interface (GUI).

In one embodiment, the global marketplace, authentication, and exchange platform is a mobile application. In one embodiment, the mobile application is a native mobile application. Native mobile applications are built for a specific platform with the platform Software Development Kit (SDK), tools, and languages, typically provided by the platform vendor. Examples include, but are not limited to, xCode/Objective-C for iOS, Eclipse/Java for Android, Visual Studio/C# for Windows Phones. In another embodiment, the mobile application is a mobile web (Mobile Web) application. Mobile Web applications are server-side applications, built with any server-side technology, including, but not limited to, PHP, Node.js, and ASP.NET, that render Hypertext Markup Language (HTML) that has been styled so that it renders well on a device form factor.

In another embodiment, tagged inventory and/or objects are connected to a web site by a user.

In another embodiment, tagged assets and/or objects are connected to a hybrid mobile application (Hybrid App) by a user. A Hybrid App is an application that is written with the same technology used for websites and mobile web implementations, and that is hosted or runs inside a native container on a mobile device. Hybrid Apps use a web view control to present the HTML and JAVASCRIPT files in a full-screen format, using the native browser rendering engine and not the browser itself. For example, WEBKIT is the browser rendering engine that is used on IOS, ANDROID, BLACKBERRY, SAFARI, MAIL, APP STORE, and others. This means that the HTML and JAVASCRIPT used to construct a Hybrid App are rendered/processed by the WEBKIT rendering engine and displayed to the user in a full-screen web view control, not in a browser. In addition, Hybrid Apps implement an abstraction layer that exposes the device capabilities, native Application Programming Interfaces (APIs), to the Hybrid App as a JAVASCRIPT API. This is not possible with Mobile Web application implementations because of the security boundary between the browser and the device APIs. Through this abstraction layer, a common set of APIs is exposed in JAVASCRIPT, and these JAVASCRIPT APIs work on any device supported by the framework.

In one embodiment, the browser rendering engine is Gecko. In another embodiment, the browser rendering engine is Goanna. In another embodiment, the browser rendering engine is KHTML. In another embodiment, the browser rendering engine is Presto. In another embodiment, the browser rendering engine is Tasman. In another embodiment, the browser rendering engine is Trident. In another embodiment, the browser rendering engine is Blink. In yet another embodiment, the browser rendering engine is Servo. In yet another embodiment, the browser rendering engine is EdgeHTML. In another embodiment, the application includes both a remote application and a desktop application.

The present invention is operable to provide applications including, but not limited to, a base application and/or an SDK for custom applications. The SDK for custom applications enables functionality including, but not limited to, registration, selling, support, maintenance, service, education, and marketing.

The application enables assets to be tagged, connected to a platform and/or marketplace, managed, and/or monetized by users.

Platform/Cloud/E-Commerce

The present invention provides a global marketplace, authentication, and exchange platform for tagged assets and/or objects to users. The global marketplace, authentication, and exchange platform is operable to read user tags and provides e-commerce functionalities to users including, but not limited to, online product sales, services invoicing, and/or credit card processing.

In one embodiment, a user account is created for the mobile application with the global marketplace, authentication, and exchange platform by a user. A user account is comprised of information including, but not limited to, an account name, an account password, at least one password recovery method, a payment method, an address, a phone number, a name, biometric data, two factor authentication (2FA) operability, and/or single sign-on (SSO) operability. In one embodiment, the at least one password recovery method is a user's email address. In another embodiment, the at least one password recovery method is a user's phone number. In another embodiment, the application is not a mobile application.

Once a user account is successfully created on the platform, a unique identifier is assigned to the user and/or all asset tags created and used by the user.

Using cloud computing technologies including, the platform is operable to provide features to users including, but not limited to, enterprise dashboards, device management, audits, reporting, mapping, invoicing, e-commerce, and/or open API integration.

Authentication

For sensitive applications, adding a second authentication method and/or factor is appropriate (also known as "two-factor authentication"). This includes applications that provide access to sensitive information including, but not limited to, credit card numbers or bank account information, or allow users to transfer funds. Mobile applications use HyperText Transfer Protocol (HTTP) as the transport layer. The HTTP protocol itself is stateless, so there must be a way to associate a user's subsequent HTTP requests with that user, otherwise the user's log in credentials would need to be sent with every request. In one embodiment, the second authentication method is stateful authentication. Stateful authentication generates a unique session ID when the user logs in. In subsequent requests, this session ID serves as a reference to the user details stored on the server. The session ID is opaque, in that it does not contain any user data. In one embodiment, the session ID is random. In one embodiment, the second authentication method is stateless authentication. With stateless authentication, all user-identifying information is stored in a client-side token. The token is passed to any server or micro service, eliminating the need to maintain a session state on the server. Stateless authentication is often factored out to an authorization server, which produces, signs, and encrypts the token upon use login.

In one embodiment, the second authentication method is an additional user password, wherein the additional user password is distinct from the user's original account password. In one embodiment, the second authentication method is a personal identification number (PIN) number. In another embodiment, the second authentication method is a user-created pattern on a mobile computing device. In yet another embodiment, the second authentication method is a one-time password generator. In yet another embodiment, the second authentication method is a hardware token generating a one-time password. In yet another embodiment, the second authentication method is user biometric data. User biometric data includes, but is not limited to, a user's fingerprint(s), retina(s), facial features, heartbeats, vein recognition, and/or voice.

In one embodiment, the second authentication method is a passive contextual authentication. Passivate contextual authentication includes, but is not limited to, geolocation, IP address, time of day, and/or the device being used by the user.

In one embodiment, the second authentication method uses the OWASP Mobile AppSpec Verification Standards (MASVS). MASVS is split into two authentication levels. In one embodiment, the MASVS level is level one. Level one MASVS functions with non-critical applications and suggests the following authentication requirements: if the app provides users with access to a remote service, an acceptable form of authentication such as username and/or password authentication is performed at the remote endpoint; a password policy exists and is enforced at the remote endpoint; the remote endpoint implements an exponential back-off, or temporarily locks the user account, when incorrect authentication credentials are submitted an excessive number of times.

In one embodiment, the MASVS level is level two. Level two MASVS functions with sensitive applications and includes the following, in addition to the level one requirements: a second factor of authentication exists at the remote endpoint and the second factor authentication requirement is consistently enforced; step-up authentication is required to enable actions that deal with sensitive data and/or transactions; the application informs the user of the recent activities with their account when they log in.

In another embodiment, 2FA functionality is enabled on the platform and/or application by a user.

In another embodiment, SSO functionality is enabled on the platform and/or application by a user. SSO is a property of access control of multiple related, yet independent software systems. With this property, a user logs in with a single ID and password to gain access to any of several systems. In one embodiment, SSO uses a Lightweight Directory Access Protocol (LDAP) and stored LDAP databases on servers. In another embodiment, SSO uses cookies. In one embodiment, SSO is Kerberos-based, wherein the initial sign-on prompts the user for credentials and gets a Kerberos ticket-granting Ticket (TGT). In one embodiment, SSO is smart-card-based, wherein initial sign-on prompts the user for the smart card. Additional software applications also use the smart card, without prompting the user to re-enter credentials. Smart-card-based SSO can use certificates and/or passwords stored on the smart card. In one embodiment, SSO is based on a Security Assertion Markup Language (SAML). SAML is an XML-based method for exchanging user security information between an SAML identity provider and a SAML service provider.

User account information is operable for editing after the account has been created. In addition, the platform provides an account profile page to users. The account profile page is operable to display information associated with the user's account including, but not limited to, available payment methods, a list of items registered with the user account, user account settings, user reviews, shortcuts to the user's enterprise dashboard, etc.

In one embodiment, an existing social media account is linked to the global marketplace, authentication, and exchange platform by a user. Examples of social media accounts operable to be linked with the platform include, but are not limited to, FACEBOOK, TWITTER, INSTAGRAM, SNAPCHAT, LINKEDIN, TUMBLR, PINTEREST, SINA WEIBO, REDDIT, TIKTOK, VKONTAKTE, FLICKR, MEETUP, INTERNATIONS, XING, and/or NEXTDOOR.

Once an account is created on the platform and/or application, assets tagged by a user are registered with a user's account by scanning and/or reading the tag associated with a specific asset.

Additionally, the global marketplace, authentication, and exchange platform is operable to allow a user to perform actions after a user account is created including, but not limited to, selling registered assets associated with the user account, buying registered assets from other user accounts, loaning registered assets to other users, borrowing registered assets from other users, renting registered assets to other users, renting registered assets from other users, trading registered assets with other users, marketing registered assets, reviewing registered assets, and/or reviewing purchased assets.

Once registered, tagged assets associated with a user account are listed on the global marketplace, authentication, and exchange. In one embodiment, a tagged asset's view is set to private, wherein only user-selected accounts have access to the tagged asset's information. In another embodiment, a tagged asset's view is set to public, wherein any user of the global marketplace, authentication, and exchange platform can view the tagged asset's information. Tagged asset information includes, but is not limited to, a product name, a category, a description, a quantity, a weight, dimensions, a density, a temperature, a humidity, an image, a video, manufacturer data (e.g., manufacturer name), a model number, a date of packaging, previous ownership information, a current market value, a historical market value, purchase data (e.g., previous purchase price(s), purchase date(s)), asset condition data, a location (e.g., current location), an asset review score, a serial number, a unique identifier (e.g., MAC address), a SKU number, warranty information (e.g., warranty expiration date), an expiration date, service information, and/or custom user notes.

Registered tagged assets are operable to be associated with the tagged asset's specific manufacturer. The platform and/or application is operable to provide alerts and/or reminders about events associated with tagged asset to a user, including, but not limited to, maintenance, repair(s), selling and/or offering product refills associated with the tagged asset, availability of accessories and/or add-ons for the tagged asset, services associated with the tagged asset, and/or loan date.

In one embodiment, the tag and platform are used to authenticate an asset as genuine. A unique and unduplicated serial number, or a media access control (MAC) address, is given to the tag when the tag is manufactured, when the tag is used in combination with a smart disc, or with a mobile device. The tag is placed on or connected to the asset. To authenticate the asset, the tag on the asset is read by the smart disc and/or the mobile device. This data associated with the tag and read by the smart disc is sent to the platform, wherein the platform is operable to confirm the serial number and/or MAC address as authentic and send a notification to the mobile device and/or smart disc confirming or denying the asset's authenticity.

Organization

After a user account is created and at least one tagged asset is registered, the platform and/or application is operable to provide asset organization to the user.

In one embodiment, organization is for a user's personal and/or home inventory. Organization is based on asset information including, but not limited to, name, category, functionality, location, acquisition date, market value, quantity, and/or asset status (i.e., new, recently repaired, needs repair, etc.). In one embodiment, the application is operable to enable a user to specify which property a registered asset is located at when a user owns or spends time at more than one property (e.g., college dorm room and parental home).

In another embodiment, organization is for a user's business inventory. Organization is based on item information including, but not limited to, manufacturer, asset origin, shipping destination, associated assets, purchase date, sale date, previous owner, pending owner, asset size, asset weight, asset shipping cost, on-premises location, asset category, asset order number, additional associated assets, additional assets in an order, purchase price, sale price, and/or number of previous owners.

In another embodiment, organization is for a user's business inventory and tracking, wherein the business is associated with the sale and use of alcohol. The platform enables tracking of beer, wine, and/or liquor pours in real-time, near real-time, at set intervals, and/or any schedule set by the user. Smart discs are placed under each bottle, container, glass, and/or other container device, enabling the acquisition of instant and accurate weight data, as well as the unique identification of the type of container device and type of alcohol.

In another embodiment, organization is for a user's business inventory and tracking, wherein the business is associated with the sale of *cannabis*. The platform enables a user to track a weight of every *cannabis* sale in real-time, near real-time, at set intervals, and/or any schedule set by the user. Smart discs are used to acquire weight and measurement data associated with an individual *cannabis* sale.

In another embodiment, organization is for a user's business inventory and tracking, wherein the business is associated with the sale of food and beverages. The platform enables users to track asset data associated with individual food and beverage products in real-time, near real-time, at set intervals, and/or any schedule set by the user. In one embodiment, smart discs are used to acquire asset data associated with the individual food and beverage products.

In another embodiment, organization is for a user's business inventory and tracking, wherein the business is associated with the sale of pharmaceuticals. The platform enables tracking a weight and data associated with every pharmaceutical product sale in real-time, near real-time, at set intervals, and/or any schedule set by the user. Smart discs are used to acquire data including, but not limited to, weight and measurement associated with an individual pharmaceutical product sale.

For example, where the business is operating in the alcohol or *cannabis* industry, an employee or individual wearing a NFC bracelet is operable to receive information from the smart discs when a measurement and/or weight is taken. The smart disc is operable to read the NFC bracelet, or closest NFC device, to associated the measurement and/or weight with the employee or individual wearing the NFC bracelet.

In one embodiment, at least one smart disc is operable to read data from at least one wearable device, wherein the at least one smart disc and the at least one wearable device are operable for network communication. Data from the at least one wearable device includes, but is not limited to a measurement and/or a weight, wherein the measurement and/or the weight is associated with at least one tagged asset and/or at least one asset to be tagged. Wearable devices include, but are not limited to, a smart watch, such as an APPLE WATCH, SAMSUNG GALAXY WATCH, FITBIT, AMAZFIT BIP, a fitness band, smart jewelry, and/or an activity tracker.

Furthermore, the platform enables creation and editing of a wish list of assets that a user is interested in. This includes, but is not limited to, assets a user wishes to purchase from other users, assets a user wishes to trade for, assets a user is seeking to loan for a period of time, assets a user is seeking to learn more about, and/or assets associated with already-registered user assets.

Communities

The global marketplace, authentication, and exchange platform offers support for user-created and/or developer-created communities. Developer-created communities include, but are not limited to, communities based on specific tagged and registered assets, communities for item and/or product support, communities for user trading, and/or communities based on user-created content.

In one embodiment, the global marketplace, authentication, and exchange platform is operable to create a community based on a specific asset, wherein the platform allows users to join the community if they have registered the specific asset or if the specific item is an asset of interest. Communities enable users to share ideas related to specific assets and/or asset collections, buy assets from one another, sell assets to one another, loan assets to one another, schedule video and/or chat sessions within the application and/or platform, and/or schedule in-person meet-ups with community members.

In one embodiment, the platform and/or application allows creation of at least one set and/or at least one collection relating to a user's tagged and/or registered assets. Collections and/or sets are user-defined or pre-defined categories as provided by the platform, application, and/or web site.

In another embodiment, a community is created using Artificial Intelligence (AI), Machine Learning (ML), and/or Deep Learning (DL). AI, ML, and/or DL techniques are used to analyze the registered assets of every user of the platform and create communities based on information including, but not limited to, commonly registered assets, rare registered assets, popular registered assets, user sets and/or collections, and/or common support issues associated with registered assets.

New communities are regularly suggested to users by the platform and/or application. In one embodiment, a new community is recommended by the platform and/or application to a user based on AI, ML, and/or DL applications. In another embodiment, a new community is recommended to a user by the platform and/or application based on newly registered assets associated with the user's account. In another embodiment, a new community is recommended on a recent user purchase, sale, trade, and/or loan.

Supported Payment Options

The global marketplace, authentication, and exchange platform enables functions to be performed by a user including, but not limited to, searching, buying, selling, trading, and marketing their assets. In order to participate in a transaction, a valid payment method must be used and/or provided by a user. Valid payment methods include, but are not limited to, PAYPAL, STRIPE, SHOPIFY PAYMENTS, TRANSFERWISE, SQUARE, 2CHECKOUT, PAYONEER, SKRILL, GOOGLE PAY, AUTHORIZE.NET, INTUIT, DWOLLA, BRAINTREE, WOLRDPAY, AMAZON PAY, KLARNA, WEPAY, BLUESNAP, SECURION PAY, PAYU, BIT PAY, CARDINAL COMMERCE, PAYZA, PAYPRO GLOBAL, PAYSIMPLE, RPAY, COINGATE BITCOIN PAYMENT PROCESSOR, virtual currency, cryptocurrencies, credit card, debit card, and/or gift card.

In one embodiment, the platform provides a platform-specific currency, which is able to be purchased by users. The platform-specific currency is operable for purchase using any of the aforementioned valid payment methods. The platform-specific currency is operable for use for any transactional operation performed using the platform.

In one embodiment, the platform and/or application is operable to transfer funds from a user to another user without the need for a purchase, sale, trade, and/or loan.

Printing Tags

In addition, the global marketplace, authentication, and exchange platform is operable to provide new tags for any asset and/or object. In one embodiment, a new printable QR code from the global marketplace, authentication, and exchange platform is created by a user. In one embodiment, a new tag for a container is printed by a user, wherein the new tag provides information associated with individual assets inside the container. In another embodiment, a new printable bar code from the global marketplace, authentication, and exchange platform is created by a user. In another embodiment, a new printable SKU label from the global marketplace, authentication, and exchange platform is created by a user.

In another embodiment, tags are purchased from the application and/or platform owner. This ensures that the tag quality is consistent and enables the application and/or platform owner to ensure that tags are genuine. When tags are purchased from the application and/or platform owner, a set of tag IDs are pre-registered to a customer, enabling assets to be registered to a user when the tags ship to the user.

The global marketplace, authentication, and exchange platform is operable to be searched by users for registered assets, owned by other users, using several methods including, but not limited to, basic text searching, voice searching, and/or image searching.

Tags are operable to store information relating to the asset-to-be-tagged. This information is modifiable prior to printing of a tag for the specified asset by a user and after the tag is attached to the specified asset by the user.

User and Dashboard Views

The global marketplace, authentication, and exchange platform provides a number of viewing options to users relating to actions including, but not limited to, application-specific functions, asset-specific functions, business-specific functions, organizational functions, social media-specific functions, payment management functions, data importing functions, and/or data exporting functions. Each of these requires a variety of operational commands and/or capabilities. All viewing options are operable to provide users with text information, visuals, and/or combinations thereof.

Figure 6:
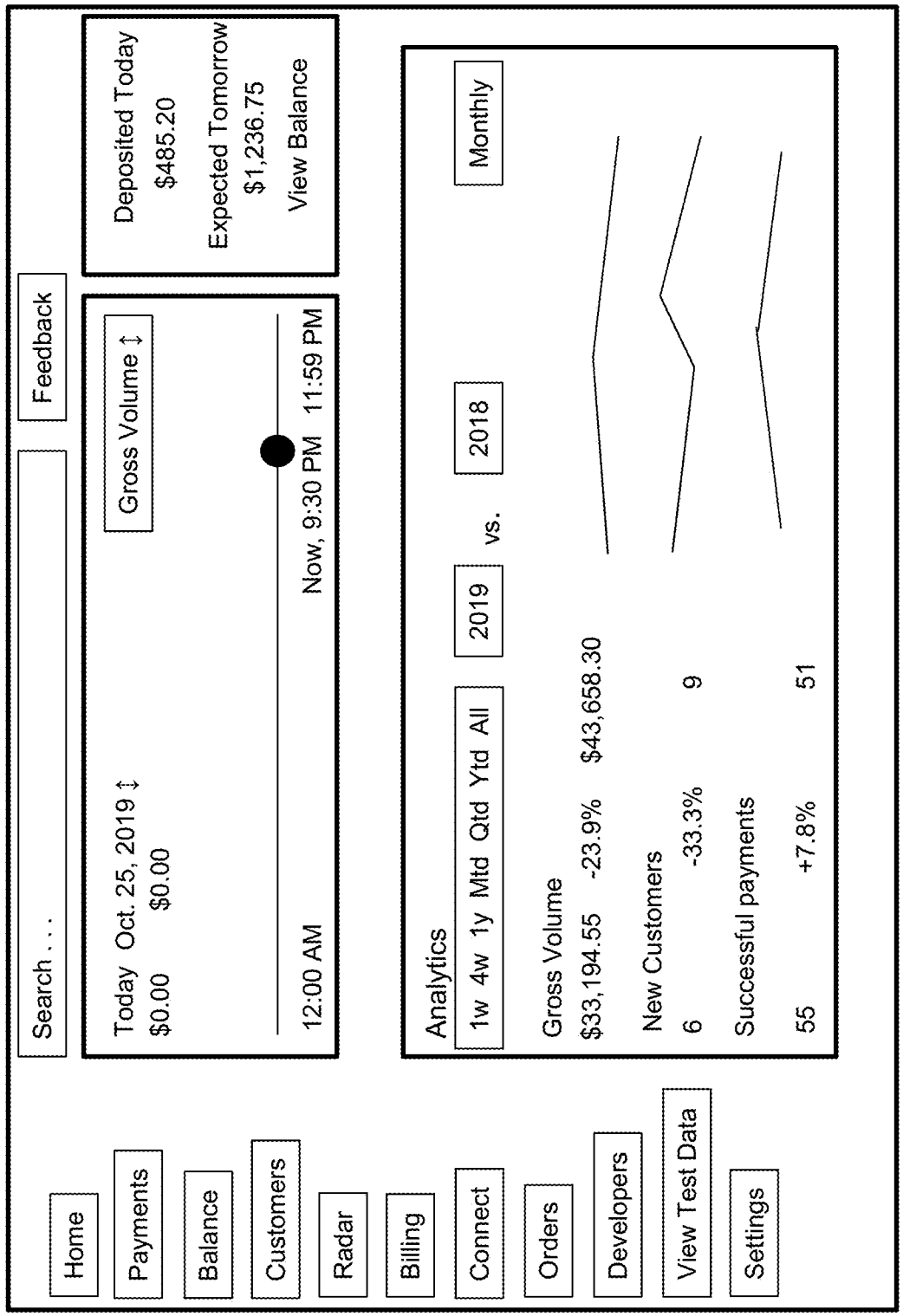
FIG. 6 illustrates one embodiment of an Enterprise dashboard of the present invention.

FIG. 6 illustrates one embodiment of an Enterprise dashboard of the present invention. The Enterprise dashboard is operable to provide users with selectable options, via a graphical user interface (GUI), including, but not limited to, a user's Home page, a payments view, a balance view, a customer view, a radar view, a billing view, a connect view, an orders view, a developers view, a test data view, and/or a settings view. The Enterprise dashboard is operable to display, via a GUI, graphics including, but not limited to, a gross volume graphic, an analytics graphic, and/or a deposit graphic. The gross volume graphic includes, but is not limited to, view options by date, view options by time, a dollar value corresponding to a date, and/or a dollar value corresponding to a time. The deposit graphic includes, but is not limited to, a deposit value for a given date, an expected deposit value for a future date, and/or a balance view. The analytics graphic includes, but is not limited to, a weekly view, a yearly view, a month-to-date view, a quarter-to-date view, a year-to-date view, a comparison between at least two date ranges, a gross volume indicator, a new customer indicator, a successful payment indicator, an average revenue per customer indicator, and/or a net volume from sales indicator. In one embodiment, all graphics and views are operable for user interaction. In one embodiment, the graphics and views are changed in real-time or near real-time. In another embodiment, the Enterprise dashboard is a dynamic Enterprise dashboard.

In one embodiment, the user's Enterprise dashboard enables viewing a user's registered assets, pending sales for at least one registered asset, at least one community that the user has joined and/or created, an overall value of the user's registered assets, historical data for at least one past user sale, and/or a geo location for at least one of a user's registered assets.

Figure 7:
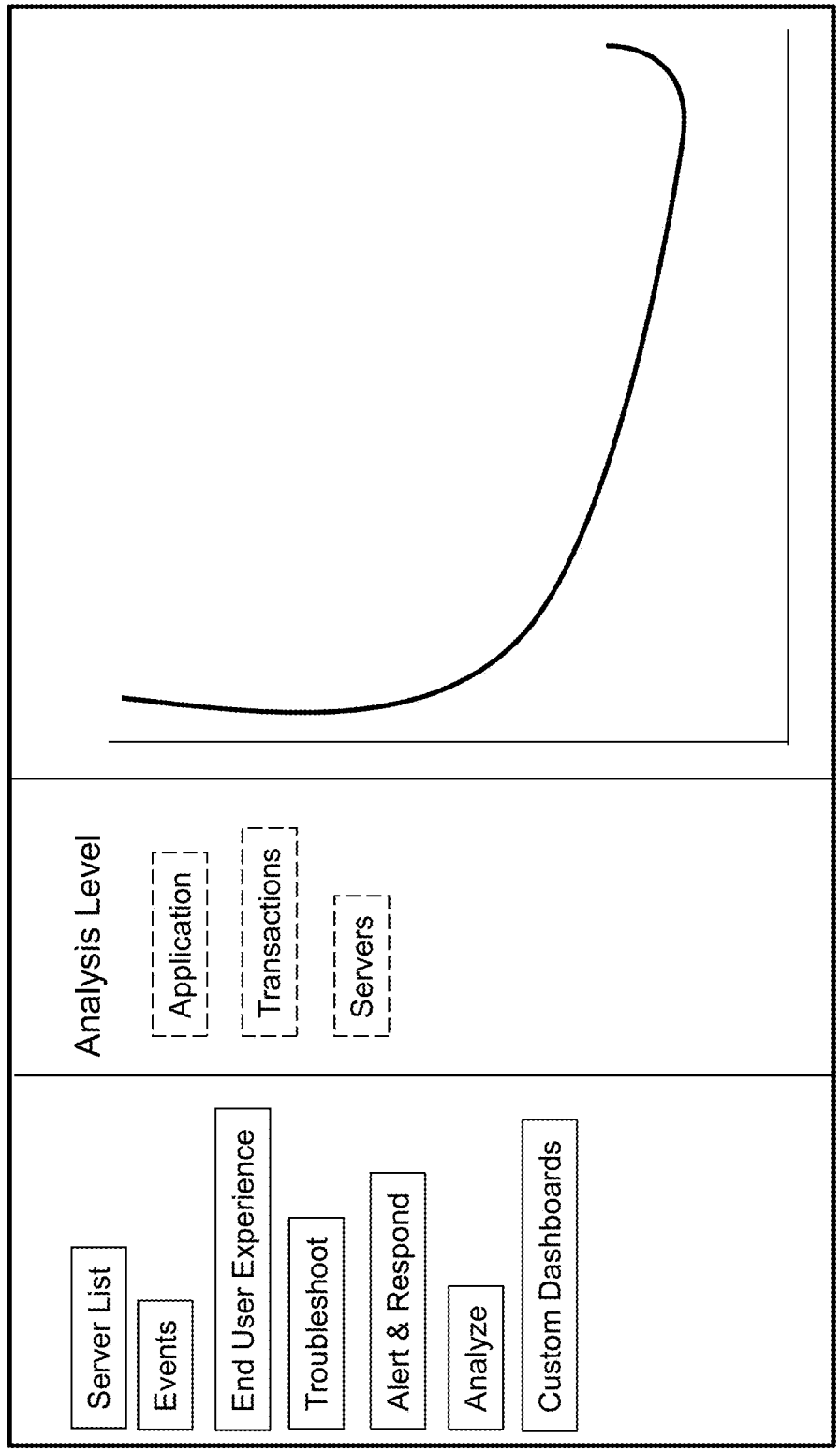
FIG. 7 illustrates another embodiment of an Enterprise dashboard of the present invention.
Figure 8:
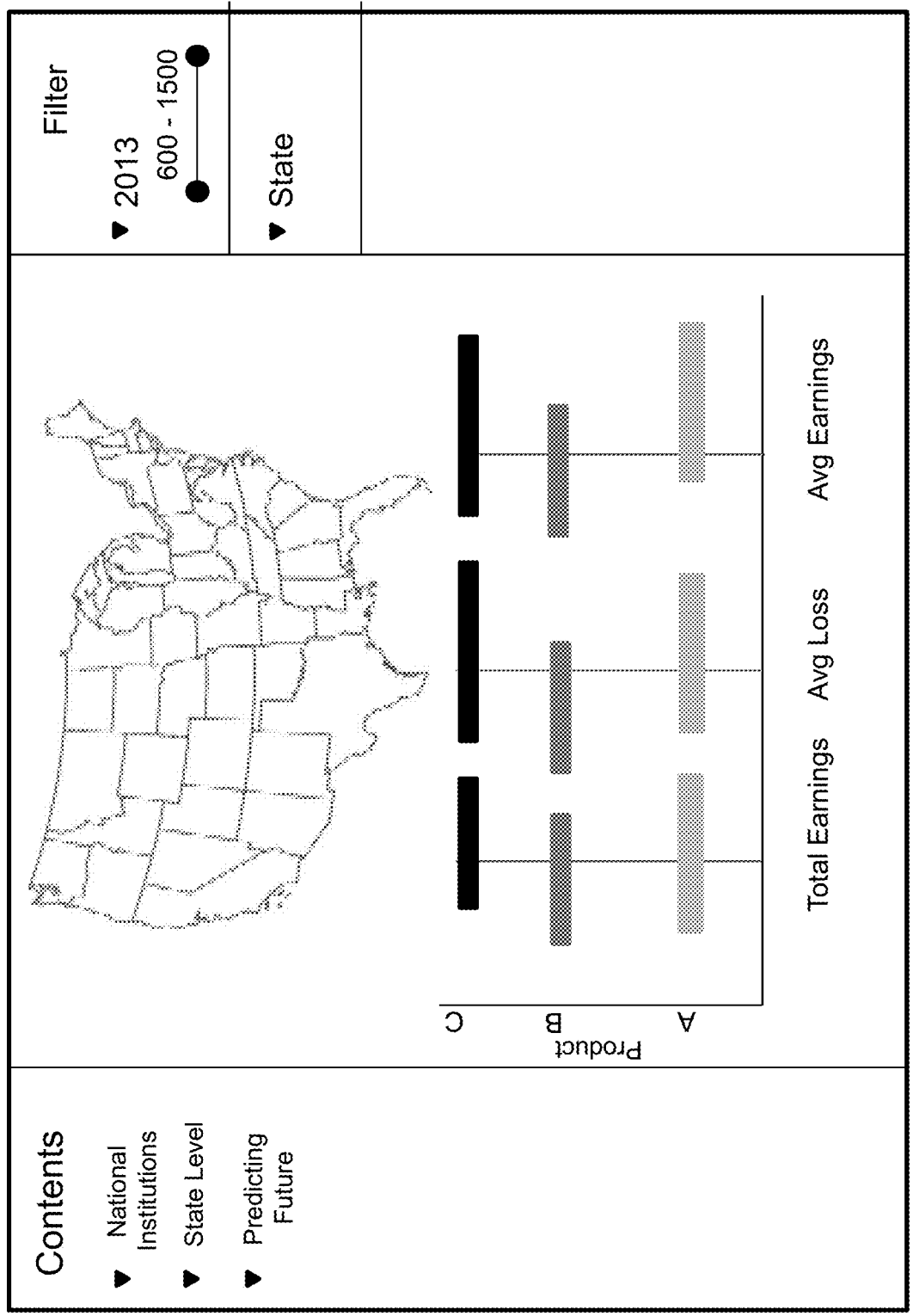
FIG. 8 illustrates another embodiment of an Enterprise dashboard of the present invention.

FIG. 7 illustrates another embodiment of an Enterprise dashboard of the present invention. This embodiment provides GUI views including, but not limited to, business transactions, servers, application servers, databases, remote services, events, end user experiences, troubleshooting, response time, errors, violations, alerts, responses, policies, rules, actions, email options, analysis, a metric browser, information points, scalability analysis, correlation analysis, reporting, release comparisons, and/or custom dashboards. Each view is operable to provide a corresponding graph, wherein the corresponding graph is operable for interactivity with the user via the GUI of the global marketplace, authentication, and exchange FIG. 8 illustrates another embodiment of an Enterprise dashboard of the present invention. The dashboard is operable to provide a global and/or national view. The global and/or national view is further operable to be filtered by options including, but not limited to, a date range, a price range, a unit range, country level, state level, county level, and/or city level. The selected filter options provide a geographic map, based on the filter options, on the dashboard to the user via the GUI. In addition, the dashboard is operable to include a prediction function that uses at least one of machine learning (ML), deep learning (DL), and/or artificial intelligence (AI) for predicting market activity based on the selected filter options. The dashboard view further includes information including, but not limited to, a list of user assets, a total earnings indicator for each asset, an average loss indicator for each asset, and/or an average earnings indicator for each asset.

In one embodiment, a user and/or dashboard view is an investment portfolio view. The investment portfolio view provides up to date information to users regarding registered asset performance and allocation. For example, the investment portfolio view gives users a visual representation of what markets are captured by a user's registered assets.

In one embodiment, a user and/or dashboard view is an executive dashboard view. For business inventories, an executive dashboard view enables viewing an entirety of business assets and identifying, in real-time, strengths and weaknesses of the assets by an executive.

In one embodiment, a user and/or dashboard view is a profit margin analysis view. For both personal and business assets, a profit margin analysis view provides measurement of an effectiveness of asset transactions at generating profit on revenue brought in as visualization to users. The profit margin analysis view assists users in making both long-term and short-term financial decisions relating to their registered assets.

In one embodiment, the platform and/or application is operable to allow users to create their own custom view. Once created, custom views are further operable for modification and/or editing.

In one embodiment, the platform and/or application provides a developer with a view displaying at least one tracked metric. The at least one tracked metric includes, but is not limited to, a time spent using the platform and/or application, a number of transactions processed, a number of user-to-user trades, a number of user-to-user loans, user community contribution, a total number of registered inventory items for all users, user-feedback, and/or Artificial Intelligence (AI), Machine Learning (ML), and/or Deep Learning (DL) performance.

Exporting and Sharing Data

The global marketplace, authentication, and exchange platform enables importing and/or exporting data relating to tagged and registered assets by users. In one embodiment, a user's asset list is exported as a Comma Separated Values (CSV) file. In another embodiment, a user's asset list is exported as a Portable Document Format (PDF) file. In another embodiment, a user's asset list is exported to a user's DROPBOX, BOX, GOOGLE DRIVE, or a similar file storage system. In yet another embodiment, a user's asset list is exported to EVERNOTE or a similar organization application.

The platform supports an auto-sync feature, enabling users to sync and/or share their data across all devices and/or with other users. In one embodiment, the remote application and desktop application sync with each other once they are connected to the same WI-FI network. Thus, data is operable to be accessed from both remote and desktop computing locations by a user.

Big Data and Artificial Intelligence

Artificial Intelligence (AI) can be divided into two disciplines: Machine Learning (ML) and Deep Learning (DL). ML involves the creation of computers and software that can learn from data, and then apply that knowledge to brand new data sets. DL creates neural networks, designed to resemble the human brain, and is used to process data including, but not limited to, sounds and images. AI cannot function without data. "Big Data" refers to the massive sets of data that are required and available for AI. Big Data sets can be structured data including, but not limited to, transactional data in a relational database, and less structured or unstructured data, including, but not limited to, images, email data, and/or sensor data. These data sets can be analyzed to find patterns, trends, and facilitate making future predictions.

ML algorithms provide effective automated tools for data collection, analysis, and integration. When combined with cloud computing power, ML enables fast and thorough processing and integration of large amounts of various information. ML algorithms can be applied to every element of a Big Data operation including, but not limited to, data labeling and/or segmentation, data analytics, diagnostics, planning, prediction, and/or scenario simulation.

In one embodiment, AI, ML, and/or DL is used to predict future markets of interest to a user based on the user's current registered assets. In one embodiment, AI, ML, and/or DL is operable to locate additional monetization opportunities including, but not limited to, those based on social media trends, changes in the market value of a registered asset and/or assets, and/or newly registered assets. In another embodiment, AI, ML, and/or DL is used to connect users with other users based on information including, but not limited to, emerging social media trends, ownership of common registered assets, emerging market trends, communities joined, recent purchases, recent sales, recent loans, asset reviews, and/or user reviews.

In one embodiment, the platform deploys Artificial Intelligence (AI). In one embodiment, the platform and/or application deploys Machine Learning (ML). In another embodiment, the platform deploys Deep Learning (DL). In yet another embodiment, the platform deploys AI, ML, DL, and/or combinations thereof.

AI, ML, DL, and/or Big Data enable the platform to gather data intelligence, forecast, map, and provide market intelligence.

Markets

The global marketplace, authentication, and exchange platform functions across multiple market sectors. In one embodiment, the market sector is for accessories, filters, and/or add-ons. Applications in this market include, but are not limited to, marketing and selling product refills, filters, accessories, and add-ons to existing products. Key features of this market include, but are not limited to, tagging assets by users, connecting tagged assets to the global marketplace, authentication, and exchange platform, registering connected assets to a user account, listing products, authenticating the origin and genuineness of assets, and and/or e-commerce functionality.

In one embodiment, the market sector is for services and maintenance. Applications in this market include, but are not limited to, tracking and selling products, tracking and selling services and maintenance on available products. Key features of this market include, but are not limited to, tagging assets by users, connecting tagged assets to the global marketplace, authentication, and exchange platform, registering connected assets to a user account, tracking services for registered assets, sending invoices, geo mapping, and/or e-commerce functionality.

In another embodiment, the market sector is for support and repairs. Applications in this market include, but are not limited to, providing instant and specific product report and selling repair services. Key features of this market include, but are not limited to, tagging assets by users, connecting tagged assets to the global marketplace, authentication, and exchange platform, registering tagged assets to a user account, tracking support for registered assets, tracking repairs for registered assets, sending invoices, and/or e-commerce functionality.

In another embodiment, the market sector is for upgrading, sales, and marketing. Applications include, but are not limited to, marketing and selling upgrades to users, communicating affiliated products, and/or offering affiliated services for registered assets and/or affiliated products. Key features include, but are not limited to, tagging assets by users, connecting tagged assets to the global marketplace, authentication, and exchange platform, registering connected assets to a user account, providing users with a list of products similar to a previously-registered asset and/or based on a user's activity, providing users with a list of available upgrades for registered products, geo mapping, and/or e-commerce functionality. In one embodiment, ML, AI, and/or DL is used to determine a list of products similar to a previously-registered asset and/or based on a user's activity. In another embodiment, ML, AI, and/or DL is used to provide marketing suggestions to a user based on the user's registered assets. In yet another embodiment, ML, AI, and/or DL is used to prompt users for potential untagged assets a user owns based on the user's current registered and tagged assets.

In one embodiment, the market sector is for community and/or social media. Applications include, but are not limited to, enabling users to join product and/or asset communities and/or share assets across various social media platforms. Key features include, but are not limited to, tagging assets by users, connecting tagged assets to the global marketplace, authentication, and exchange platform, registering connected assets to a user account, creating and/or joining communities based on a specific asset and/or assets, sharing user data with other users, exporting platform data to another social media platform, and/or geo mapping.

In another embodiment, the market sector is for authenticity, security, and legal needs. Applications include, but are not limited to, determining asset authenticity and/or tracking assets in the case of theft. Key features include, but are not limited to, tagging assets by users, connecting tagged assets to the global marketplace, authentication, and exchange platform, registering connected assets to a user account, geo mapping, granting police access to user records (e.g., by user), and/or open API functionality.

In yet another embodiment, the market sector is for self-service and asset manuals. Applications include, but are not limited to, enabling users to instantly access product support information, tutorial videos, manufacturer manuals, and/or live customer support. Key features include, but are not limited to, tagging assets by users, connecting tagged assets to the global marketplace, authentication, and exchange platform, registering connected assets to a user account, enabling users to create and/or join communities for specific assets, providing item support and/or tutorial videos, providing users with manufacturer and/or user-created asset manuals, access to a Frequently Asked Questions (FAQs) area, and/or providing users with a ticketing process for receiving professional asset support.

In yet another embodiment, the market sector is for market research. Applications include, but are not limited to, tracking the location of assets and/or the engagement of users relating to specific assets. Key features include, but are not limited to, tagging assets by users, connecting tagged assets to the global marketplace, authentication, and exchange platform, registering connected assets with a user account, geo mapping, user asset auditing, custom reporting services, an open database of user assets, and/or open API functionality.

Repairs, Maintenance, and Available Services

In yet another embodiment, the platform and/or application enables a timer associated with any registered asset of a user to be set based on user input. The timer is operable to be set for any number of seconds, minutes, hours, days, months, and/or years. Upon expiration of the timer, the platform and/or application notifies a user of an action associated with the corresponding registered asset. For example, a user tags and registers a washing machine. Once registered, the user is able to set a timer associated with the washing machine. Upon expiration of the timer, the platform and/or application sends a notification to the user for events including, but not limited to, washing machine maintenance and/or repair, cleaning, alerts the user of new products and/or services associated with the washing machine, washing machine replacement, similar and/or new washing machines available for purchase, asset manual updates, and/or loan expiration.

In yet another embodiment, the platform and/or application provides repair, maintenance, and/or asset-related services to users. In one embodiment, a refrigerator is tagged in the platform and/or application by a user, wherein the tag contains information including, but not limited to date of purchase, date of last repair and/or service, last service and/or repair status, upcoming scheduled repair, available maintenance operations, available product upgrades, and/or replacement parts. For example, when the water filter of a tagged refrigerator needs replacing, the application and/or platform provides a notification to a user and offers the user support services related to replacing and/or upgrading the water filter for the refrigerator. In addition, the application and/or platform provides the user with tutorials on replacing water filters, wherein the tutorials include, but are not limited to, manufacturer manuals, user-created manuals, manufacturer videos, and/or user-created videos.

In another example, the tagged item is a sofa. Sofas see varied levels of wear and tear over the years and it becomes necessary to replace cushions, pillows, and/or other sofa-related items. When a user needs to replace at least one of these items, the platform and/or application enables the user to scan the sofa tag and provides the user with services relating to the repair and/or replacement of their specific tagged sofa. The platform and/or application enables tracking all services and/or maintenance performed on a user's registered items.

In another example, the item is a piece of furniture that requires construction. Upon receipt of the piece of furniture, a tag is attached and scanned, or the tag is scanned if a tag was previously affixed. Scanning the tag provides the user with construction instructions from the manufacturer, user-created construction instructions, tutorial videos associated with the furniture's construction, Frequently Asked Questions (FAQs) and answers relating to the furniture's construction, images and/or video of the piece of furniture at the end of construction, manufacturer contact information, connections to users who have previously constructed the same piece of furniture, item reviews, furniture return and/or refund instructions, a link to the manufacturer's website, a link to the piece of furniture's website, links to third-party websites with information about the piece of furniture, video and/or text chat from the manufacturer, and/or registers the piece of furniture to the user's inventory.

Any service, repair, and/or maintenance performed on a tagged asset is operable to have the service, repair, and/or maintenance status added to the available information stored in the tag. The status is operable for modification in the event an additional service, repair, and/or maintenance is required and/or when a service, repair, and/or maintenance was successful.

The application and/or platform enables users to post reviews about any received information relating to an asset's service, repair, and/or maintenance. Reviews include, but are not limited to, a rating, a written review, an image, a video, at least one link to material(s) used by the user, and/or at least one link to another user.

Asset Management

The platform and/or application enables management of tagged and registered assets by a user. For example, a user, bar owner, and/or restaurant owner wants to manage their liquor assets. A bottle may be tagged when it enters the user's, bar owner's, and/or restaurant owner's inventory. A device with a tag reader reads and/or scans the tag on the bottle and communicates with the platform and/or application to record data including, but not limited to, asset name, asset manufacturer, asset weight, and/or asset quantity. The platform and/or application updates, in real-time or near-real time, every time the bottle with the tag is scanned and/or read. This enables an owner, bar owner, and/or restaurant owner to know, in real-time or near real-time, how much liquor is being sold and/or poured every minute. The tag reader and/or scanner is further operable to emit light, wherein the light is a pre-set or custom user-created color. In one embodiment, the light color is pre-set based on the tagged asset that is scanned and/or read. In one embodiment, the tag reader and/or scanner is in network communication with the platform and/or application, wherein the platform and/or application is operable to notify the user, bar owner, and/or restaurant owner that the tag reader and/or scanner is functioning properly and reporting asset information to the application and/or platform.

Asset Authentication

After an asset is registered with the platform and/or application by a user, any user is able to use this registration to authenticate the asset as genuine. Authentication helps users determine whether an asset is genuine, described appropriately, and not a forgery or fake.

In one embodiment, prior to registration of an asset, the platform and/or application prompts at least one picture of the asset to be taken or uploaded by a user. Once the at least one picture of the asset is provided to the platform and/or application, the at least one picture is analyzed to determine its authenticity. In one embodiment, AI, ML, and/or DL algorithms are used to analyze the at least one image of the asset to determine its authenticity. Authenticity results are provided in real-time and/or near real-time by the platform and/or application to a user.

In another embodiment, prior to registration of an asset, the platform and/or application prompts at least one video of the asset to be taken or uploaded by a user. Once the at least one video is provided to the platform and/or application, the at least one video is analyzed to determine the asset's authenticity. In one embodiment, AI, ML, and/or DL algorithms are used to analyze the at least one video of the asset to determine its authenticity. Authenticity results are provided in real-time and/or near real-time by the platform and/or application to a user.

In another embodiment, a combination of asset pictures and asset videos are used to authenticate an asset.

Auditing

In yet another embodiment, the platform and/or application provides support for auditing relating to a user's registered assets. In one embodiment, the platform and/or application are available online and offline. Auditing functionality includes, but is not limited to, automating tasks, scheduling reminders, controlling rights, controlling permissions, creating custom forms, and/or identifying nonconformance. Auditing functionalities are operable to integrate with existing Information Technology (IT) systems via API. Supported IT systems, include, but are not limited to, Enterprise resource planning (ERP) software systems and/or Environmental Resource Management (ERM) software systems. Supporting auditing standards include, but are not limited to, the General Data Protection Regulation (GDPR), International Organization of Standardization (ISO) standards, SOC2, National Institute of Standards and Technology (NIST) standards, Health Insurance Portability and Accountability Act (HIPPA) of 1996 standards, Payment Card Industry Data Security Standards (PCI DSSs), and/or Federal Risk and Authorization Management Program (FedRAMP) standards. In one embodiment, an SOC report is a Type 1 report. SOC Type 1 reports describe a vendor's systems and whether their design is suitable to meet relevant trust principles. In another embodiment, an SOC report is a Type 2 report. SOC Type 2 reports detail the operational effectiveness of various systems.

Reporting

In yet another embodiment, the platform and/or application is operable to providing reporting functionality for a user's registered assets. Platform and/or application reporting functionality includes, but is not limited to, database support, mashing-up multiple data sources, data visualization in dashboards and/or reports (e.g., PDF, CSV, spreadsheet), centralizing tasks, real-time updates, custom reports, date and/or time scheduling, event triggers, pre and/or post-delivery workflow, and/or data sharing. In one embodiment, pre and/or post-delivery workflows are automated using Artificial Intelligence (AI), Machine Learning (ML), and/or Deep Learning (DL). Reporting data is imported to the platform and/or application from sources including, but not limited to, files, web feeds, business applications, on-premises databases, and/or cloud storages. Reporting data is operable for extraction to applications including, but not limited to, TABLEAU, LOOKER, GOOGLE DATA, GOOGLE SHEETS, FACEBOOK, INSTAGRAM, SNAPCHAT, LINKEDIN, PINTEREST, TWITTER, ADWORDS, OUTBRAIN, and/or ADROLL. Data reporting is automatically scheduled to report to applications including, but not limited to, email, MICROSOFT WORD, MICROSOFT EXCEL, MICROSOFT POWERPOINT, and/or PDF software (e.g., ADOBE ACROBAT). Supported reporting data formats include, but are not limited MICROSOFT WORD, MICROSOFT EXCEL, PDF, HTML, TXT, CSV, and/or JSON.

In one embodiment, Natural Language Recognition (NLR) and/or Natural Language Generation (NLG) techniques are used to process reporting data. NLG refers to a software process that transforms structured data into natural language. Its uses include, but are not limited to, producing long form content for organizations to automate custom reports, producing custom content for a web and/or mobile application, and/or generate short blurbs of text in interactive conversations (i.e., a chatbot) which can be read out by a text-to-speech system. NLG systems need to include stages of planning and merging information to enable generation of text that is natural and not repetitive. Typical stages include, but are not limited to, content determination (determining what information to present in text), document structuring (overall organization of the presented information), aggregation (merging similar sentences to improve readability), lexical choice (putting words to the concepts), referring expression generation (creating referring expressions that identify objects and regions), and/or realization (creation of the actual text following the rules of syntax, morphology, and orthography).

Output for the NLG and/or NLR software and/or solution is constructed by the narrative design (i.e., a template, intent, and/or narrative type), which is created by the end user of the NLG software and/or solution. Within each narrative design is at least one set of rules, referred to as the "conditional logic," triggering different outputs based on the data set behind the content being processed.

In one embodiment, the NLG and/or NLR process is automated, wherein Artificial Intelligence (AI), Machine Learning (ML), Deep Learning (DL), and/or combinations thereof create and/or modify at least one set of rules for the NLG and/or NLR process. In another embodiment, the NLG and/or NLR processes are user-defined, wherein a user creates and/or modifies a set of rules for the NLG and/or NLR processes.

In one embodiment, the NLG and/or NLR processes are employed by a chatbot of the platform and/or application, wherein the chatbot is operable to assist a user with reporting issues. In another embodiment, the NLG and/or NLR processes are employed by a chatbot of the platform and/or application, wherein the chatbot is operable to assist a user with platform-specific and/or application-specific issues.

In one embodiment, the application and/or platform is operable to evaluate the NLG and/or NLR processes. Techniques for evaluation include, but are not limited to, task-based evaluation, a rating system wherein generated text is presented to a user and the user is asked to rate the quality and/or usefulness of the presented text, and/or metrics. Metrics compare generated text to texts written by users from the same input data. In one embodiment, an automatic metric is used. In one embodiment, the automatic metric is a Bilingual Evaluation Understudy (BLEU) algorithm. In another embodiment, the automatic metric is a HyTER algorithm. In another embodiment, the automatic metric is a ROUGE algorithm. In another embodiment, the automatic metric is based on a Word Error Rate (WER) algorithm. In yet another embodiment, the automatic metric is based on an F-score algorithm. In yet another embodiment, the automatic metric is a subtree metric (STM). In yet another embodiment, the automatic metric is a METEOR algorithm. METEOR, similar to BLEU, includes additional steps including, but not limited to, considering synonyms and comparing the stems of word. In yet another embodiment, the automatic metric is based on a Translation Error Rate (TER). TER measures the number of edits needed to change the original output translation into an acceptable human-level translation. In yet another embodiment, the automatic metric is based on TER-plus (TERp). TERp is an extension of TER that considers paraphrases, stemming, and synonyms. In yet another embodiment, the automatic metric is hLEPOR. hLEPOR is a metric designed to better for morphologically complex languages. hLEPOR considers factors including, but not limited to, capturing syntactic information from parts-of-speech (e.g., noun, verb, etc.) In yet another embodiment, the automatic metric is RIBES. RIBES is designed to be more informative for Asian languages and does not rely on word boundaries. In yet another embodiment, the automatic metric is MEWR. MEWR uses a combination of word and sentence embeddings and perplexity to score translations.

The platform and/or application supports integration with NLG and/or NLR software including, but not limited to, IBM WATSON TEXT TO SPEECH, AMAZON POLLY, AZURE TEXT TO SPEECH API, GOOGLE CLOUD TEXT-TO-SPEECH, WORDSMIT, QUILL, AX SEMANTICS, READSPEAKER, SYNTHESYS, SPEECHKIT, TEXTENGINE.IO, ABODIT NATURAL LANGUAGE ENGINE, ARRIA, YSEOP, PHRASETECH, SEMANTICMACHINES, and/or SPECIFIO.

Support Ticketing

In yet another embodiment, the platform and/or application is operable to provide support ticketing functionality for all users. Additionally, the platform and/or application is operable to track user support issues and/or engagements.

In one embodiment, chatbot support is provided for all registered users. Chatbot support provides users with ability to create and route support tickets, modify and close open support tickets, receive tickets via more than one channel, enable product registration, provide back end hooks to customer relationship management (CRM) and marketing automation systems, and/or address common IT-related application and/or management tasks.

For example, a user may encounter an issue with a recently acquired tagged asset. Issues include, but are not limited to, incorrect asset, asset history discrepancies, damaged assets, unresolved repair and/or service requests, a damaged tag, and/or issues scanning and registering assets. Support ticketing services enable users to receive assistance at critical times. The platform and/or application is operable to allow a user to request support by providing information including, but not limited to, a tagged asset, a description of the issue involved, an image and/or picture of the asset, and/or a video of the asset.

In one embodiment, support ticketing services are operable to receive a customer issue for a tagged asset and the platform and/or application directs the user to a video and/or manual relevant to the issue reported by the customer.

For example, a user may experience a technical issue with the application and/or platform. Support ticketing functionality enables the platform to receive efficient reports from users and provide updates to users based on user-encountered technical issues.

In addition, the platform and/or application is operable to integrate with existing support ticketing software and/or applications including, but not limited to, ZENDESK, AGILOFT SERVICE DESK, CAYZU, FRESHDESK, FRESHSERVICE, HAPPYFOX, JIRA SERVICE DESK, MANAGEENGINE SERVICE DESK PLUS 9.3, VIVANTIO PRO, and/or ZOHO DESK.

In one embodiment, the support ticketing functionality adheres to the Information Technology Infrastructure Library (ITIL). ITIL is an established service framework used by IT management companies. ITIL includes a set of best practices including, checklists, procedures, processes, and tasks.

In one embodiment, the platform and/or application provides users with a support widget for automatically launching support ticketing functionality.

Policing and Access Control

In yet another embodiment, the platform and/or application is operable to provide access control and/or policing functionality for all users. Access control functionalities include, but are not limited to, limiting viewing access, restricting purchases to selected users, restricting sales to selected users, restricting trading to selected users, restricting loans to selected users, restricting community access to selected users, and/or restricting user communication.

In one embodiment, the platform and/or application is operable to provide a whitelist and/or a blacklist. For example, a user has encountered a seller who has previously sent the user an asset other than what the user had purchased. In order to avoid the seller, the user places the seller on a blacklist of sellers who the user will no longer receive information from. In another example, the blacklist is for a blacklist of buyers. In yet another example, the platform and/or application allows a user to whitelist a seller with whom the user had a positive experience.

In another example, a user wants to restrict communication to only those users within close geographic proximity to the user's current location. The platform and/or application is operable to restrict the availability of possible assets to those from sellers, buyers, traders, and/or loaners within a specified geographic proximity based on user input (e.g., editing user settings).

In addition, the platform and/or application supports policing functionalities. With either personal assets or business assets, tagged assets have varying values. Thus, it is important to track and/or ensure the safety of said tagged assets throughout all operational aspects of the application and/or platform. Functionality available for these purposes, and others, includes, but is not limited to, linking tagged assets with an emergency contact, alerting a user about a change in location for a tagged asset, theft reporting processes, and/or user reporting for platform and/or application violations.

For example, the platform and/or application is operable to tag an asset with emergency contact instructions (e.g., based on user input). In the event that the tagged and registered asset has a change in location, the emergency contact instructions are executed. Emergency contact instructions include, but are not limited to, notifying the owner of the asset of a change in location, placing a designation on the asset indicating theft (e.g., alerting the next user to scan the asset of the item's theft and original owner), and/or tracking the asset as its location changes. Notification methods include, but are not limited to, email, in-application notifications, external application notifications, SMS, and/or automated message services.

In the event of asset theft, the platform and/or application enables any user to track a tagged and registered asset and report the theft of the asset to the community and/or emergency services.

None of the prior art discloses the use of Artificial Intelligence (AI), Machine Learning (ML), and/or Deep Learning (DL) in conjunction with a global marketplace and exchange platform for tagging and managing a user's inventory, including "dumb" devices and/or unconnected devices.

The platform and/or application preferably includes at least one user device. The at least one user device is in network communication with the at least one smart disc and/or the at least one cloud platform. The at least one user device includes a wearable device (e.g., smart watch), a mobile device, a smartphone, a tablet, and/or a computer (e.g., desktop computer, laptop). In one embodiment, the at least one user device is in network communication with the tagged asset. In one embodiment, the at least one user device is in network communication with a smart hub.

Figure 9:
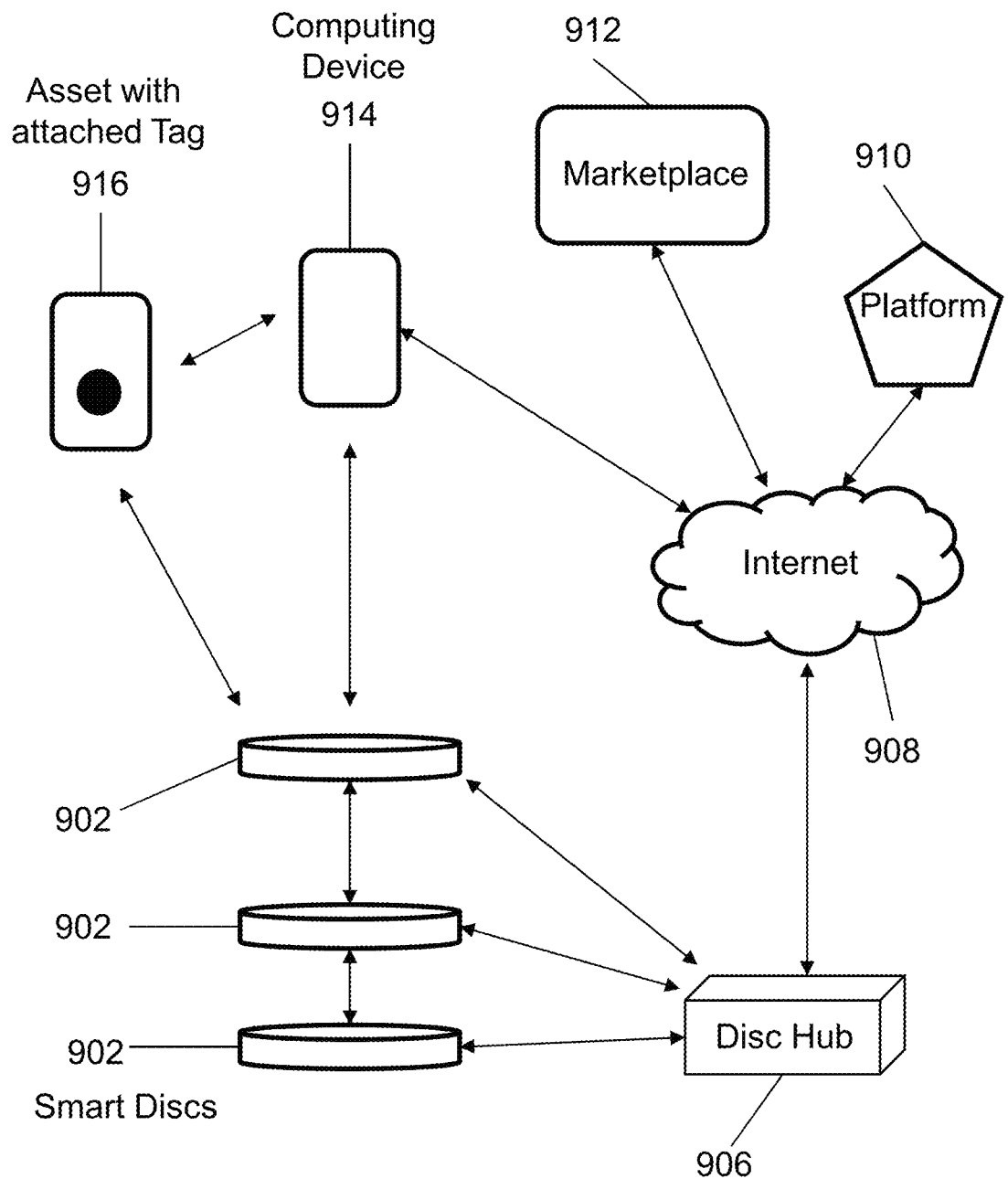
FIG. 9 illustrates one embodiment of a platform architecture of the present invention.

FIG. 9 illustrates one embodiment of a platform architecture of the present invention. At least one computing device 914 is operable to read at least one tag connected to at least one asset 916 and write to at least one tag connected to at least one asset 916, wherein the at least one tag connected to at least one asset 916 is operable for data storage. The at least one computing device 914 includes, but is not limited to, a device operable to capture audio, video, and/or images of an asset. In addition, the at least one computing device 914 is operable for network communication with at least one smart disc 902 and at least one platform 910. The at least one platform 910 provides the authentication, management, and data analysis of the assets using tags and other capture data. Moreover, the at least one platform 910 provides users with a community and an e-commerce marketplace 912 to buy, sell, trade, and discuss products and services related to an asset. Each of the at least one smart disc 902 is operable to read at least one tag connected to at least one asset 916 and write data to at least one tag connected to at least one asset 916, wherein the at least one tag connected to at least one asset 916 is operable for data storage. Each of the at least one smart disc 902 is further operable to weigh, measure, capture images, capture video, and/or record audio of at least one asset. Each of the at least one smart disc 902 is operable for network communication with other smart discs 902 as well as with a mesh network. Each of the at least one smart disc 902 are further operable for network communication with the at least one platform 910 through a computing device and through a disc hub 906. In one embodiment, the computing device is a mobile computing device. The disc hub 906 enables network communication between at least two smart discs 902, wherein the disc hub 906 is in network communication with the Internet 908. In one embodiment, the disc hub 906 enables wireless network communication between smart discs 902 including, but not limited to, BLUETOOTH, NFC, and/or WI-FI, wherein the smart discs 902 are further operable for network communication with the at least one platform 910.

Figure 10:
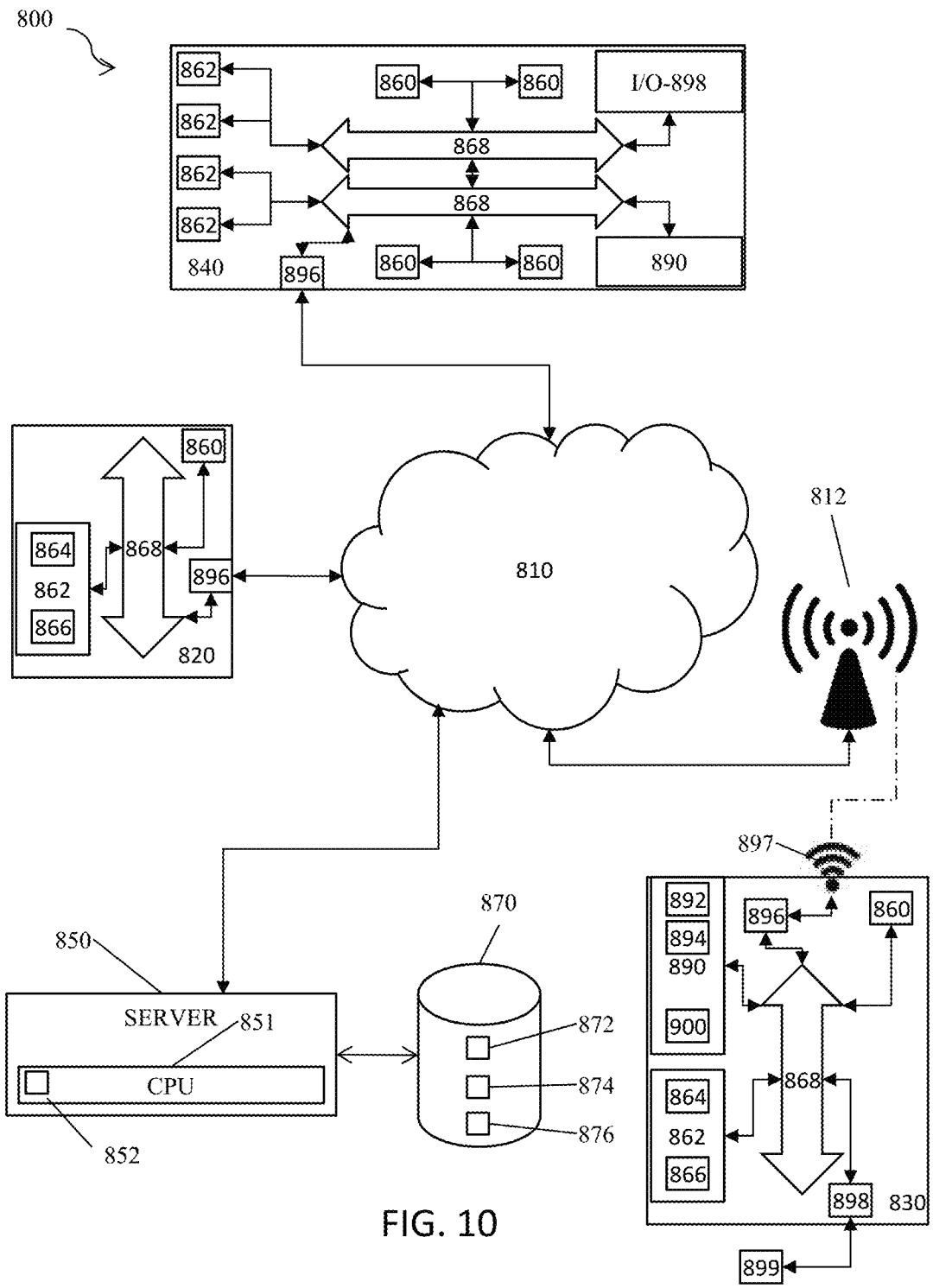
FIG. 10 illustrates a schematic diagram of a system of the present invention.

FIG. 10 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computer devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication include RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, notebook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system buss 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one us 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 10, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system.) Alternatively, some steps or methods may be performed by circuitry that is specific to a given function.

According to various embodiments, the computer system 800 may operate in a networked environment using logical connections to local and/or remote computing devices 820, 830, 840 through network 810. A computing device 830 may connect to network 810 through a network interface 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 may not include all of the components shown in FIG. 10, may include other components that are not explicitly shown in FIG. 10, or may utilize an architecture completely different than that shown in FIG. 10. the various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or portioned in a different way), but such implementation decisions should not be interpreted as causing a departure from the scope of the present invention.

The global marketplace, authentication, and exchange platform supports cloud computing models and/or architectures. Cloud computing refers to the on-demand availability of computer system resources, including data storage and computing power, without direct active management by the user. Large clouds have functions distributed over multiple locations from central servers. Furthermore, if the connection to a user is relatively close, it is designated as an edge server. In one embodiment, the cloud computing model is a public cloud. Public clouds are owned and operated by third-party cloud service providers who deliver their computing resources over the Internet. In one embodiment, the public cloud is MICROSOFT AZURE. With a public cloud, all hardware, software, and other supporting infrastructure is owned and managed by the cloud provider. The services are accessed and managed by using a web browser and/or application.

In another embodiment, the cloud computing model is a private cloud computing model. A private cloud refers to cloud computing resources used exclusively by a single business or organization. A private cloud is one in which the services and infrastructure are maintained on a private network. In one embodiment, the private cloud is physically located on a company's on-site datacenter. In another embodiment, the private cloud is hosted by a third-party service provider.

In yet another embodiment, the cloud computing model is a hybrid cloud computing model. Hybrid clouds combine public and private clouds, bound together by technology that allows data and applications to be shared between each other. Hybrid clouds offer greater flexibility, deployment options from purely private or purely public cloud models, and provide optimizations relating to infrastructure, security, and compliance.

Cloud computing models provide management of assets in the global marketplace, authentication, and exchange platform to users using an Enterprise dashboard. The Enterprise dashboard provides functions including, but not limited to, device management, auditing services, reporting, mapping, invoicing, e-commerce, and/or open API. The Enterprise dashboard provides a view of real-time and historical information to users. Key benefits of an Enterprise dashboard include, but are not limited to, graphical presentations of real-time data, the ability to generate detailed reports for multiple levels, improved productivity by providing faster and more efficient access to information, and/or complete visibility into all systems instantly.

An open API is publicly available for all developers to access. It allows developers, outside of an organization's workforce, to access backend data that can be used to enhance their own applications. APIs are sets of requirements that govern how one application can communication and/or interact with another. APIs further allow developers to access certain internal functions of a program. An API may be used by both developers inside an organization that published the API and/or by any developers outside that organization who wish to register for access to the interface.

Open APIs are characterized by their free availability to developers and are backed with access to open data, based on an open standard that developers abide by. Open APIs enable developers outside of the proprietary organization to access the backend data that can then be used to enhance their own applications or create new ones.

In one embodiment, the open API is configured for Point-of-Sale (POS) systems. An open API POS system enables developers to build a custom POS for payment systems. Open APIs for POS systems include, but are not limited to, SQUARE'S POS API, SPRINGBOARD, CONNEKTPOS, SIMPLICITY POS, VEND and XERO, BINDO POS, TOAST, UNICENTA OPOS, MULESOFT, and/or API CONNECT.

In one embodiment, the open API is configured for emergency services. Emergency services APIs enable users to contact emergency services how and where they want. Emergency services API functionality, like others, is embedded directly into the application and/or platform, enabling users to connect to public safety services without the infrastructure that is traditionally required. Open APIs for emergency services include, but are not limited to, BANDWIDTH, TWILIO, E911, NUMBERS, FLOWROUTE, GEO911, and/or QUESTBLUE.

In one embodiment, the open API is configured for asset tracking. Open APIs for asset tracking include, but are not limited to, LOCATE, TMF639 RESOURCE INVENTORY MANAGEMENT, ODOO, LINNWORKS, CIN7, INFOPLUS, FINALE INVENTORY, BRIGHTPEARL, SKUSUITE, NETSUITE, SELLERCLOUD, KATANA MRP, FISHBOWL, ORDERHIVE, ZOHO INVENTORY, SKULABS, and/or ECOUNT ERP.

In another embodiment, the open API is configured for marketing. Marketing functionality includes, but is not limited to, location-based offers, customer views, chart generation, transaction data, recurring payment data, mailing lists, subscriptions, updating social media accounts, and/or contact records. Open APIs for asset marketing include, but are not limited to, REST, SOAP, MARKETING, GOPINLEADS, WAKUP, ZAIUS, IMAGE-CHARTS, ROVER BULK, MARKETO JAVASCRIPT, OPTIMOVE, SHEERSEO, JVZOO, MOOSEND, SENDSMITH, CREATORIQ, KNOCK, and/or QUANTUMDIGITAL.

In another embodiment, the open API is configured for social network functionality. Open APIs for social networking functionality include, but are not limited to, FACEBOOK, INSTAGRAM, YOUTUBE, PINTEREST, TWITTER, FLICKR, FOURSQUARE, IMGUR, KAKAO, LINKEDIN, MASTODON, PATH, REDDIT, SNAPCHAT, TELEGRAM, SINA WEIBO, and/or AMAZON.

The previously mentioned open APIs are operable to be integrated individually and/or in combination with one another.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

What is claimed is:

1. A system for asset tagging and management, comprising:
   at least one tag affixed to an asset;
   at least one smart disc including at least one sensor operable to acquire data from the at least one tag;
   at least one cloud platform including a virtual marketplace; and
   at least one wearable device in network communication with the at least one smart disc;
   wherein the at least one tag includes asset data related to the asset;
   wherein the asset includes a container operable to hold one or more liquids and/or one or more solids;
   wherein the at least one tag provides information about the one or more liquids and/or the one or more solids in the container;
   wherein the at least one smart disc is operable to measure a weight of the asset via at least one scale included in the at least one smart disc;
   wherein the at least one cloud platform is operable to register the asset to a user account, and wherein the user account includes the asset data;
   wherein the at least one smart disc is operable to read the at least one tag using the at least one sensor;
   wherein upon the at least one smart disc reading the at least one tag, a current location of the asset is stored in the at least one cloud platform;
   wherein the at least one smart disc is operable for network communication with the at least one cloud platform;
   wherein the at least one smart disc is operable to send the one or more of the asset data to the at least one cloud platform;
   wherein the at least one cloud platform is operable to create an inventory of assets, wherein the inventory of assets includes the asset, and wherein the inventory of assets is included in the user account;
   wherein the at least one cloud platform is operable to facilitate transactions on the virtual marketplace based on the authentication of tagged assets and the asset data;
   wherein the at least one smart disc is configured to measure first weight data for the container after a first transaction involving the container and send the first weight data to the at least one cloud platform and the at least one wearable device; and
   wherein the at least one smart disc is configured to measure second weight data for the container after a second transaction involving the container and send the second weight data to the cloud platform and the at least one wearable device;
   wherein the at least one cloud platform is operable to schedule services for the asset based on the asset data.

2. The system of claim 1, wherein the at least one tag is operable to be read using automatic identification and data capture (AIDC) technologies including near field communications (NFC), quick response (QR) codes, bar codes, radio frequency identification (RFID), universal product codes (UPCs), biometrics, magnetic strips, optical character recognition (OCR), smart cards, image and/or video analysis, passive reader active tag (PRAT) technologies, active reader active tag (ARAT) technologies, and/or active reader passive tag (ARPT) technologies.

3. The system of claim 1, wherein the asset data includes a product name, a category, a description, and/or a quantity.

4. The system of claim 1, wherein the at least one smart disc is at least two smart discs, and wherein the at least two smart discs are in network communication with each other.

5. The system of claim 1, wherein the at least one cloud platform is operable to authenticate the asset based on the tag data of the asset.

6. The system of claim 1, wherein the at least one cloud platform is operable to create the at least one tag.

7. The system of claim 1, wherein the at least one cloud platform is operable to learn the inventory using artificial intelligence algorithms, and wherein the inventory is organized into at least one collection and/or at least one set.

8. The system of claim 1, wherein the transactions include buying the asset, selling the asset, trading the asset, loaning the asset, renting the asset, marketing the asset, upgrading the asset, maintenance of the asset, customer services related to the asset, and/or repair of the asset.

9. The system of claim 1, wherein the at least one cloud platform is operable to make recommendations based on the inventory of assets, the virtual marketplace, social media activity, user activity, asset reviews, and/or user reviews.

10. The system of claim 1, wherein the at least one cloud platform is operable to generate at least one report.

11. The system of claim 1, wherein the at least one smart disc is further operable to send the first weight data and the second weight data to at least one other smart disc.

12. The system of claim 1, wherein the current location is determined using a Global Positioning System (GPS).

13. The system of claim 12, wherein the current location of the asset is tracked in real time via the GPS, and wherein the at least one cloud platform is configured to transmit at least one notification to the at least one wearable device in real time upon detection of a location change of the asset via the GPS.

14. A system for asset tagging and management, comprising:
at least one tag affixed to an asset;
at least one smart disc including at least one sensor operable to acquire data from the at least one tag;
at least one user device;
at least one cloud platform including a virtual marketplace; and
at least one wearable device capable of sending and receiving data transmitted via network communication to and from the at least one smart disc;
wherein the at least one tag includes asset data related to the asset;
wherein the asset includes a container operable to hold one or more liquids and/or one or more solids;
wherein the at least one tag provides information about the one or more liquids and/or the one or more solids in the container;
wherein the at least one smart disc is operable to measure a weight of the asset via at least one scale included in the at least one smart disc;
wherein the at least one cloud platform is operable to register the asset to a user account, wherein the user account includes the asset data;
wherein the at least one smart disc is operable to read the at least one tag using the at least one sensor;
wherein upon the at least one smart disc reading the at least one tag, a current location of the asset is stored in the at least one cloud platform;
wherein the at least one smart disc is operable to collect one or more of the asset data;
wherein the at least one smart disc is operable for network communication with the at least one cloud platform;
wherein the at least one user device is operable for network communication with the at least one smart disc and/or the at least one cloud platform;
wherein the at least one cloud platform is operable to receive the one or more of the asset data;
wherein the at least one cloud platform is operable to create an inventory of assets, wherein the inventory of assets includes the asset, and wherein the inventory of assets is included in the user account; and
wherein the at least one cloud platform is operable to facilitate transactions on the virtual marketplace based on the authentication of tagged assets and the asset data;
wherein the at least one cloud platform is operable to schedule services for the asset based on the asset data.

15. The system of claim 14, wherein the at least one user device is a wearable device, a mobile device, a tablet, a computer, and/or a smart phone.

16. The system of claim 14, wherein the at least one smart disc is operable to read data from the at least one user device.

17. The system of claim 14, wherein the at least one user device is operable to receive data from the at least one smart disc and/or the at least one cloud platform.

18. A method for tagging and management of assets, comprising:
providing at least one tag, wherein the at least one tag is affixed to an asset, wherein the at least one tag includes asset data related to the asset;
providing at least one cloud platform including a virtual marketplace; and
providing at least one smart disc including at least one sensor operable to acquire data from the at least one tag, wherein the at least one smart disc is in network communication with the at least one cloud platform;
wherein the asset includes a container operable to hold one or more liquids and/or one or more solids;
wherein the at least one tag provides information about the one or more liquids and/or the one or more solids in the container;
the at least one cloud platform registering the asset to a user account, wherein the user account includes the asset data;
the at least one smart disc reading the at least one tag;
the at least one smart disc determining a current location of the asset upon reading the at least one tag and sending the current location of the asset to the at least one cloud platform;
the at least one smart disc measuring a weight of the asset via at least one scale included in the at least one smart disc and transmitting the weight of the asset to the at least one cloud platform and at least one wearable device;
the at least one cloud platform creating an inventory of assets, wherein the inventory of assets includes the asset, and wherein the inventory of assets is included in the user account; and
the at least one cloud platform facilitating transactions on the virtual marketplace based on the authentication of assets and the asset data;
wherein the at least one cloud platform is operable to schedule services for the asset based on the asset data.

19. The method of claim 18, further comprising the at least one cloud platform learning the virtual marketplace and predicting market activity using artificial intelligence algorithms.

* * * * *